US009774256B2

(12) United States Patent
Augustoni

(10) Patent No.: US 9,774,256 B2
(45) Date of Patent: Sep. 26, 2017

(54) DUAL SOURCE DC TO DC CONVERTER

(71) Applicant: Gerald Augustoni, Ottawa (CA)

(72) Inventor: Gerald Augustoni, Ottawa (CA)

(73) Assignee: SOLANTRO SEMICONDUCTOR CORP., Ottawa (CA)

(*) Notice: Subject to any disclaimer, the term of this patent is extended or adjusted under 35 U.S.C. 154(b) by 379 days.

(21) Appl. No.: 14/455,410

(22) Filed: Aug. 8, 2014

(65) Prior Publication Data

US 2015/0326108 A1 Nov. 12, 2015

Related U.S. Application Data

(60) Provisional application No. 61/989,926, filed on May 7, 2014.

(51) Int. Cl.
H02J 1/00 (2006.01)
H02J 3/00 (2006.01)
H02M 3/158 (2006.01)
H02M 1/00 (2006.01)

(52) U.S. Cl.
CPC .... H02M 3/158 (2013.01); *H02M 2001/0048* (2013.01); *H02M 2001/0077* (2013.01); *Y02B 70/1491* (2013.01); *Y10T 307/707* (2015.04)

(58) Field of Classification Search
CPC .. H02J 3/383; H02J 1/102; H02J 3/385; H02J 3/386; H02J 3/38; H02J 1/00; H02J 7/35; H02J 3/32; H02J 3/36; H02J 3/381; H02J 3/46; H02J 1/12; H02J 3/18; H02J 3/382; H02J 3/387; H02J 3/50

USPC .......................................................... 307/82
See application file for complete search history.

(56) References Cited

U.S. PATENT DOCUMENTS

| 4,956,762 | A | * | 9/1990 | Loveness | ................ | H02M 7/72 307/82 |
| 6,295,213 | B1 | * | 9/2001 | Smith | ............... | H02M 3/33569 363/21.01 |
| 6,906,476 | B1 | * | 6/2005 | Beatenbough | ......... | H05B 41/40 315/209 R |
| 8,022,661 | B1 | * | 9/2011 | Bauer | ................ | H01M 10/052 320/101 |
| 8,212,409 | B2 | * | 7/2012 | Bettenwort | ............. | H02J 1/102 307/82 |
| 2008/0164766 | A1 | * | 7/2008 | Adest | ........................ | H02J 1/12 307/80 |
| 2008/0303503 | A1 | * | 12/2008 | Wolfs | ........................ | G05F 1/67 323/301 |
| 2011/0084553 | A1 | * | 4/2011 | Adest | ...................... | H02J 1/102 307/63 |

(Continued)

*Primary Examiner* — Jared Fureman
*Assistant Examiner* — Esayas Yeshaw
(74) *Attorney, Agent, or Firm* — Rahman LLC

(57) ABSTRACT

A system includes a first buck type direct current (DC) to DC converter having: a first control switch; a first synchronized switch; an inductor; and a capacitor. The system further includes a second buck type DC to DC converter having: a second control switch; a second synchronized switch; the inductor; and the capacitor. The system further includes a controller operatively connected to the first buck type DC to DC converter and the second buck type DC to DC converter, wherein the controller controls a conduction state of the first control switch and the second control switch; and an output terminal pair operatively connected to the capacitor.

23 Claims, 20 Drawing Sheets

(56) References Cited

U.S. PATENT DOCUMENTS

| | | | | |
|---|---|---|---|---|
| 2011/0193520 A1* | 8/2011 | Yamazaki | ............... | B60L 5/005 |
| | | | | 320/108 |
| 2012/0043818 A1* | 2/2012 | Stratakos | ................ | H02J 3/383 |
| | | | | 307/77 |
| 2012/0161528 A1* | 6/2012 | Mumtaz | .................. | H02J 3/383 |
| | | | | 307/82 |
| 2012/0281444 A1* | 11/2012 | Dent | ....................... | H02M 1/32 |
| | | | | 363/56.01 |
| 2015/0103575 A1* | 4/2015 | Ku | .......................... | H02M 7/48 |
| | | | | 363/132 |

* cited by examiner

DUAL SOURCE DC TO DC CONVERTER

CROSS-REFERENCE TO RELATED APPLICATIONS

This application claims priority to U.S. Provisional Patent Application Ser. No. 61/989,926 filed on May 7, 2014, the complete disclosure of which, in its entirety, is hereby incorporated by reference.

BACKGROUND

Technical Field

The embodiments herein generally relate to power generation and specifically to power optimization of a power generator.

Description of the Related Art

Solar photovoltaic (PV) panels are becoming an increasingly popular means of generating electrical power. PV panels are comprised of individual solar cells connected in series. The open circuit voltage of a PV panel depends on the number of cells in the panel. Solar cells based on silicon technology typically have an open circuit voltage of about 0.7 V. A PV panel with 60 serially connected cells would have an open circuit DC voltage of around 42 V. Solar cells within a PV panel are often organized into sub-strings. A 60 cell PV panel is often organized as three substrings of 20 cells each. Contact points to connect to the sub-strings are often available inside a panel. PV panel currents are typically at least several amperes. PV panels are often serially connected together to form "strings" to increase the output voltage of the PV panel array and reduce wiring losses. It is common to have as many as 20 PV panels in a string producing an open circuit string voltage on the order of 1,000 V.

The DC current of a PV panel is variable and depends on it operating voltage as well as a variety of other parameters including the amount of insolation it receives, its age, any shadowing and soiling. Physically identical PV panels can therefore have different currents. A problem of serially connecting PV panels is that the PV panel with the lowest DC current will limit the current of the entire string and reduce the amount of useful power the string can produce.

SUMMARY

In view of the foregoing, an embodiment herein provides a system comprising a first buck type direct current (DC) to DC converter comprising: a first control switch; a first synchronized switch; an inductor; and a capacitor. The system further comprises a second buck type DC to DC converter comprising: a second control switch; a second synchronized switch; the inductor; and the capacitor. The system further comprises a controller operatively connected to the first buck type DC to DC converter and the second buck type DC to DC converter, wherein the controller controls a conduction state of the first control switch and the second control switch; and an output terminal pair operatively connected to the capacitor. The first synchronized switch may comprise a first diode operatively connected to the first control switch; and wherein the second synchronized switch may comprise a second diode operatively connected to the second control switch.

The controller may control operation of the first and second synchronized switches. The system may further comprise a bypass diode operatively connected to the output terminal pair. The system may further comprise a first power source operatively coupled to the first buck type DC to DC converter; and a second power source operatively coupled to the second buck type DC to DC converter. The first and second buck type DC to DC converters and the controller may operate as a DC optimizer. Furthermore, the first and second buck type DC to DC converters and the controller may operate as a DC power supply. The first and second DC to DC converters and the controller operate as a bi-directional DC power supply. Any of the first and second power sources may comprise a solar photovoltaic panel. Moreover, any of the first and second power sources may comprise any of a fuel cell, a battery, and a storage type power source. The capacitor may directly connect to a positive terminal of one power source and a negative terminal of the other power source.

The system may further comprise a power source string comprising at least one DC optimizer configured to be serially connected with at least another DC optimizer; and an inverter operatively connected to the power source string. The controller may operate the DC optimizer to maintain the first and second power sources at their respective maximum power points. Moreover, the controller may operate the at least one DC optimizer such that an output current of the at least one DC optimizer matches a string current of the power source string. The first control switch may control an output power of the first power source, and the second control switch may control an output power of the second power source. The first buck type DC to DC converter may convert a DC voltage of a first independent power source to an equal or lower first voltage, wherein the second buck type DC to DC converter may convert a DC voltage of a second independent power source to an equal or lower second voltage, and wherein a sum of the first and second voltages may appear at the output terminal pair.

Furthermore, a duty cycle of the first switch may determine an output current of the first buck type DC to DC converter, and a duty cycle of the second switch may determine an output current of the second buck type DC to DC converter. Each of the first control switch and the second control switch may articulate from an open state of operation and a closed state of operation, wherein the closed state of operation may permit current from any of the first independent power source and the second independent power source to flow therethrough and through to the output terminal pair. In the open state of operation, current flowing in the inductor during the closed state of operation may continue to flow from the inductor through to the output terminal pair. The first control switch and the first synchronized switch may comprise a first pair of complementary switches, wherein the second control switch and the second synchronized switch may comprise a second pair of complementary switches, wherein each of the first pair of complementary switches and the second pair of complementary switches may comprise a first complementary switch and a second complementary switch, wherein when the first complementary switch is in the closed state of operation the second complementary switch is in the open state of operation, and wherein when the first complementary switch is in the open state of operation the second complementary switch is in the closed state of operation.

The system may further comprise a third buck type DC to DC converter comprising: a third control switch; a third synchronized switch; a second inductor; and a second capacitor. The system may further comprise a fourth buck type DC to DC converter comprising: a fourth control switch; a fourth synchronized switch; the second inductor; and the second capacitor. The system may further comprise a third power source operatively coupled to the third buck type DC to DC converter; and a fourth power source operatively coupled to the fourth buck type DC to DC converter, wherein the first, second, third, and fourth buck type DC to DC converters form the DC optimizer. The controller may be operatively connected to the third buck type DC to DC converter and the fourth buck type DC to DC converter, wherein the controller may control a conduction state of the third control switch and the fourth control switch, and wherein the output terminal pair may be operatively connected to the second capacitor.

Another embodiment provides a photovoltaic (PV) panel string comprising a plurality of serially connected DC optimizers, wherein at least one of the DC optimizers comprising a first buck type DC to DC converter and a second buck type DC to DC converter, wherein the first buck type DC to DC converter comprises: a first control switch; a first synchronized switch; an inductor; and a capacitor, wherein the second buck type DC to DC converter comprises: a second control switch; a second synchronized switch; the inductor; and the capacitor. The PV panel string further comprises a first solar PV panel operatively connected to the first buck type DC to DC converter; and a second solar PV panel operatively connected to the second buck type DC to DC converter.

Another embodiment provides a method comprising providing a direct current (DC) optimizer comprising a pair of buck type DC to DC converters that share an inductor and capacitor; operatively connecting a pair of independent power sources to the pair of buck type DC to DC converters, wherein the DC optimizer optimizes respective power outputs of the pair of independent power sources; and controlling an output current of the DC optimizer by selectively switching a current conducting and current non-conducting state of operation in the pair of buck type DC to DC converters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
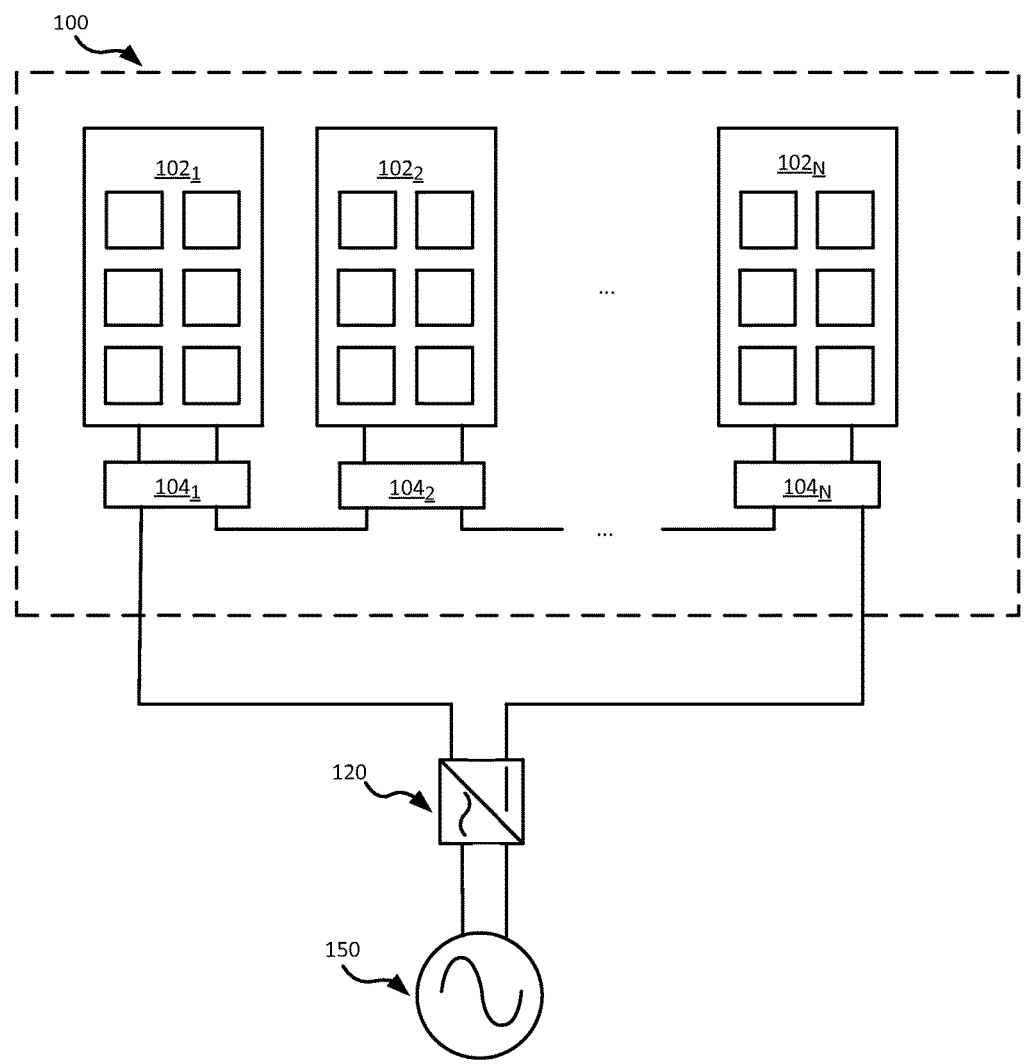
FIG. 1 is a block diagram of a PV panel string equipped with DC optimizers according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned a problem of serially connecting PV panels is that the PV panel with the lowest DC current will limit the current of the entire string and reduce the amount of useful power the string can produce. A DC optimizer could be used to prevent a PV panel with a low DC current limiting the string current. Referring now to the drawings, and more particularly to FIGS. 1 through 7, where similar reference characters denote corresponding features consistently throughout the figures, there are shown preferred embodiments.

FIG. 1 is a block diagram of a PV panel string 100 equipped with DC optimizers $104_1$, $104_2$, ... $104_N$. PV panel string 100 comprises PV panels $102_1$, $102_2$, ... $102_N$ coupled one to one with DC optimizers $104_1$, $104_2$, ... $104_N$. DC optimizers $104_1$, $104_2$, ... $104_N$ are connected serially. PV panel string 100 operatively connects to inverter 120 which converts the DC voltage of the PV panel string 100 into AC voltage for electrical grid 150. Various safety and disconnect equipment such as fuses or breakers have not been shown for simplicity, but are included in the PV panel string 100 and other components in FIG. 1. Additionally, multiple PV panel strings could be connected in parallel to the same inverter 120.

A DC optimizer, such as $104_1$, $104_2$, ... $104_N$, maximizes the energy output of a PV panel, such as $102_1$, $102_2$, ... $102_N$. A DC optimizer, such as $104_1$, $104_2$, ... $104_N$, also matches its current output to the string current. Although such terms as optimizer, optimize, maximize, and the like are used herein, these terms are not intended to infer absolute optimality or maxima. For instance, power optimization functionality may improve performance, but might not necessarily achieve theoretical maximum or optimal power production or output.

Figure 2A:
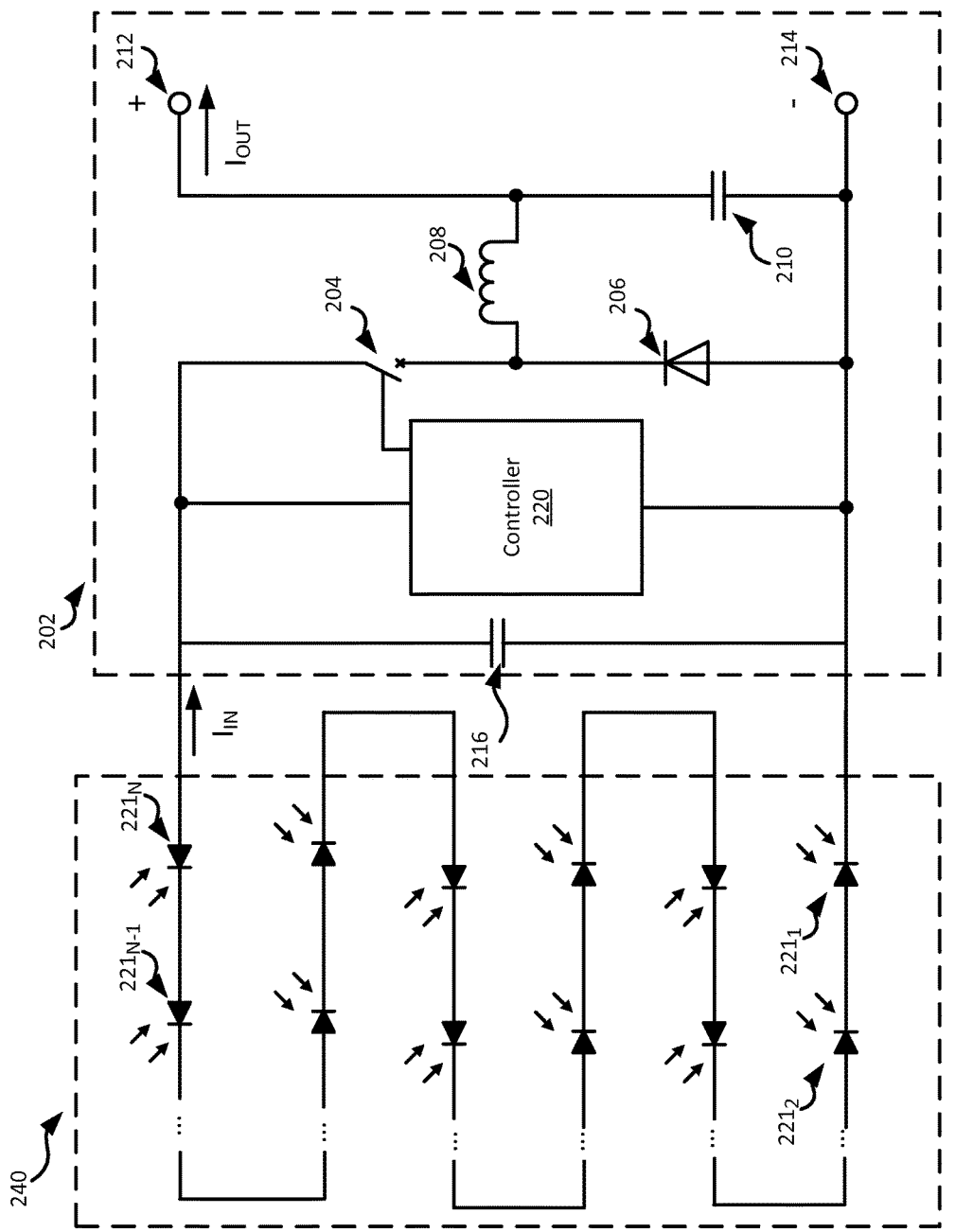
FIG. 2A is a circuit diagram of a PV panel equipped with a DC optimizer according to an embodiment herein.

FIG. 2A, with reference to FIG. 1, is a circuit diagram of an example DC optimizer 202 coupled to a PV panel 240. DC optimizer 202 comprises switch 204, diode 206, inductor 208, capacitor 210, input capacitor 216, controller 220, and output terminal pair 212, 214. DC optimizer 202 operatively connects to the remaining PV panels (e.g., $102_1$, $102_2$, ... $102_N$ of FIG. 1) in the string 100 at output terminal pair 212, 214 (the remaining PV panels in the string have not been shown for clarity of illustration). PV panel 240 comprises solar cells $221_1$ ... $221_N$ connected in series. DC optimizer 202 is an example of an asynchronous "buck" type DC to DC converter which converts the DC voltage of PV panel 240 to an equal or lower voltage at output terminal pair 212, 214.

Figure 2B:
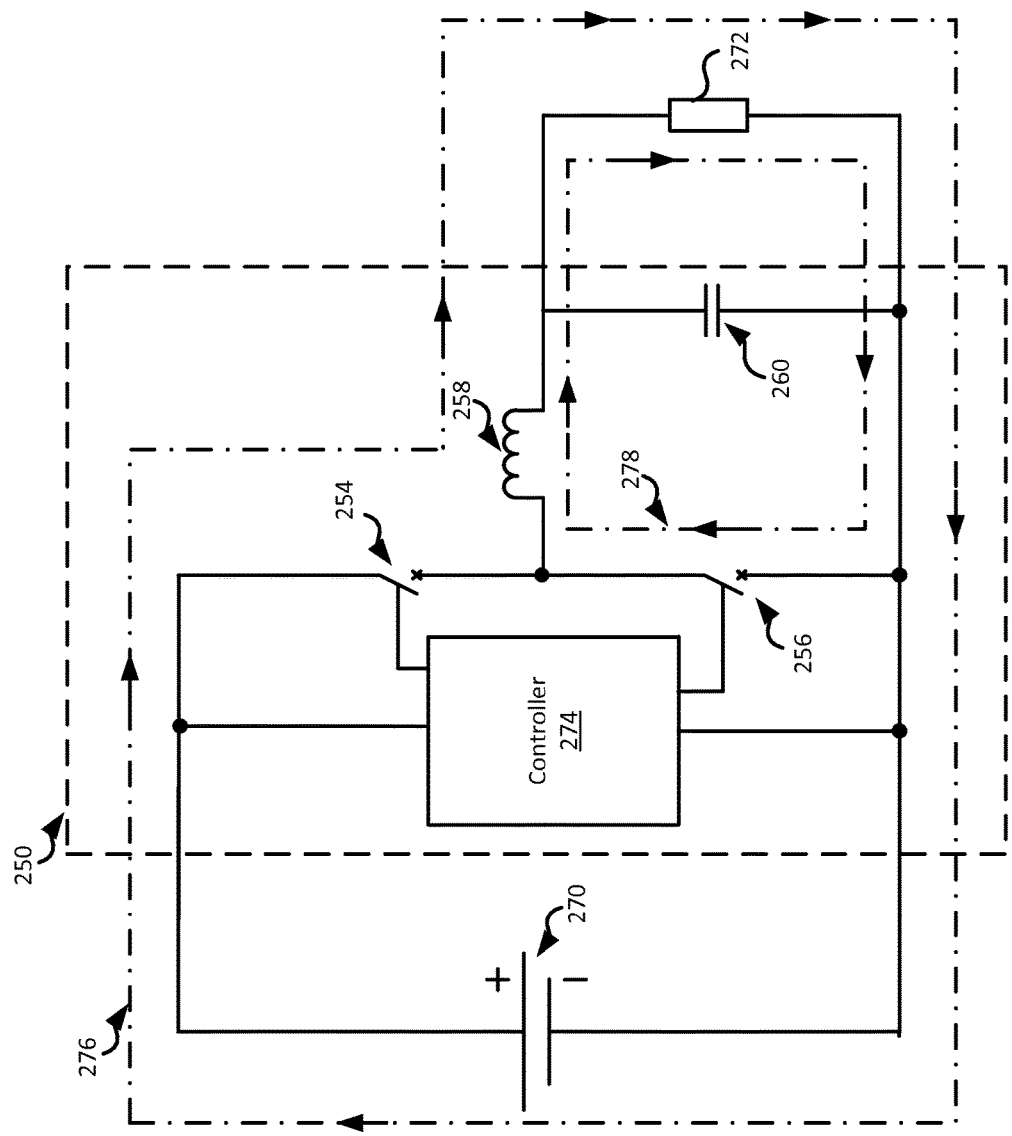
FIG. 2B is a circuit diagram of a buck type DC to DC converter in accordance with the embodiments herein.

As used herein, a "buck" type DC to DC converter converts DC power at one voltage from a voltage source at its input and supplies the DC power to a load at its output at another, lower DC voltage. FIG. 2B, with reference to FIGS. 1 and 2A, is a circuit diagram of a generic buck type DC to DC converter 250. Buck type DC to DC converter 250 comprises control switch 254, synchronized switch 256, inductor 258, switch controller 274, and capacitor 260. Buck type DC to DC converter 250 connects to DC voltage source 270 at its input and to output load 272 at its output. In a power conversion operation, control switch 254 and synchronized switch 256 are controlled by switch controller 274 to operate in a complementary fashion. When control switch 254 is "ON" and conducting, synchronized switch 256 is "OFF" and non-conducting, and when control switch 254 is "OFF" and non-conducting synchronized switch 254 is "ON" and conducting. When control switch 254 is conducting it forms first circuit path 276 with inductor 258, DC voltage source 270, and output load 272. When synchronized switch 256 is conducting it forms second circuit path 278 with inductor 258 and output load 272. Control switch 254 and synchronized switch 256 could be semiconductor switches such as, for example, Metal-Oxide-Semiconductor Field-Effect Transistors (MOSFETs), bipolar transistors or thyristors. They could also be electromechanical switches such as, for example, relays. Synchronized switch 256 could also be a diode in which case it is self-switching on a change in polarity of the voltage across it and would not require a control signal from a controller. A buck type DC to DC converter using a diode as the synchronized switch is referred to as an asynchronous buck. A buck type DC to DC converter in which the synchronized switch is controlled by a controller is referred to as a synchronous buck. The output voltage and current of buck type DC to DC converter 250 is controlled by controlling the "ON" time $T_{ON}$ of control switch 254. If control switch 250 is switched with a frequency of $f_{SW}$ and period of T then in steady state the output voltage of the buck type DC to DC converter $V_{BUCK}$ is:

$$V_{BUCK} = V_{IN} \frac{T_{ON}}{T}$$

where $V_{IN}$ is the voltage of input DC voltage source 270. The output voltage of buck type DC to DC converter 250 can therefore be controlled by controlling the ratio of $T_{ON}$ to T. The duty cycle "D" of a buck type DC to DC converter is defined as the ratio of the $T_{ON}$ to the switching period T and is normally expressed as a percentage. For example, if the control switch is ON for 70% of the switching period, then the duty cycle is 70%. The duty cycle could range from 0 to 100%. The relationship of the output current ($I_{OUT}$) of buck type DC to DC converter 250 to the input current ($I_{IN}$) from DC voltage source 270 also depends on the duty cycle and is given by the equation:

$$I_{BUCK} = I_{IN} \frac{T}{T_{ON}} = \frac{I_{IN}}{D}$$

Figure 2C:
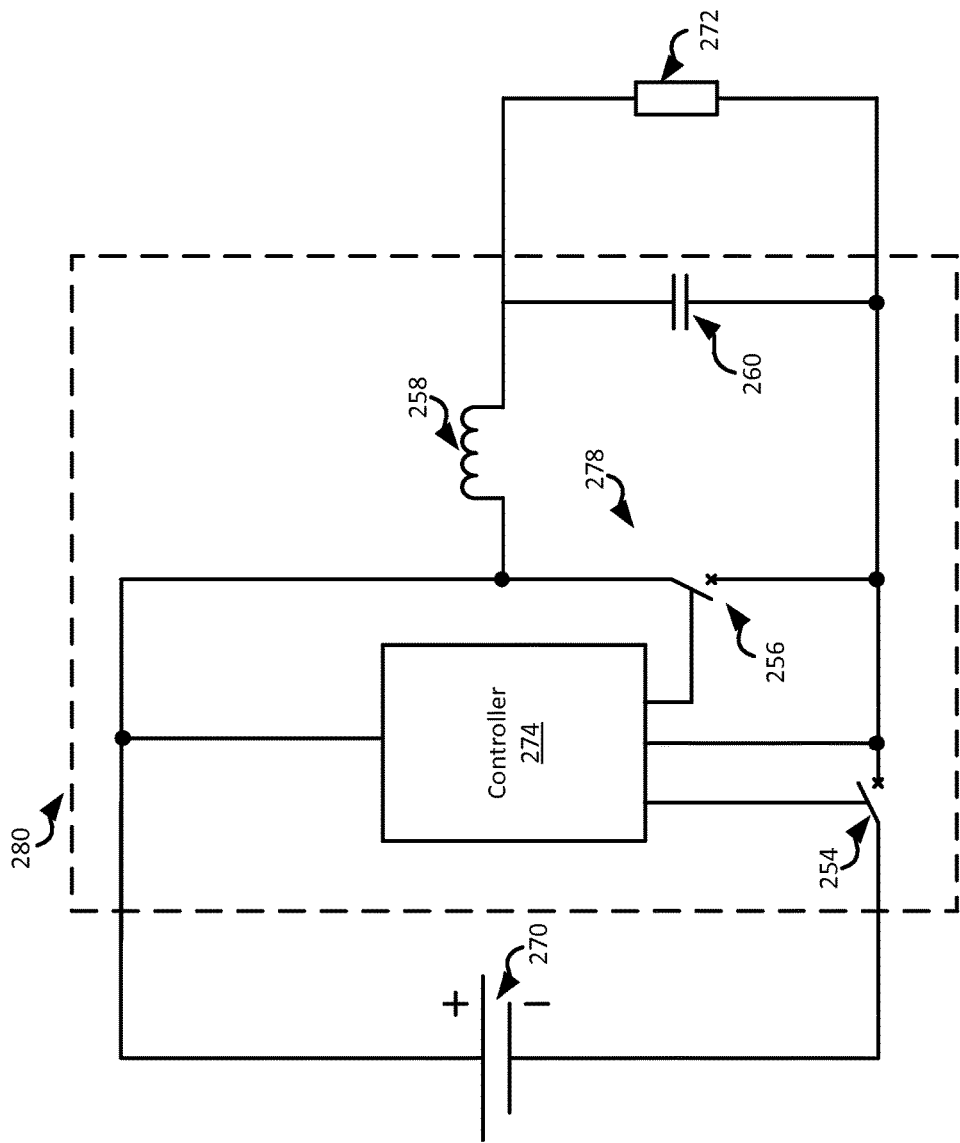
FIG. 2C is a circuit diagram of another buck type DC to DC converter in accordance with the embodiments herein.
Figure 2D:
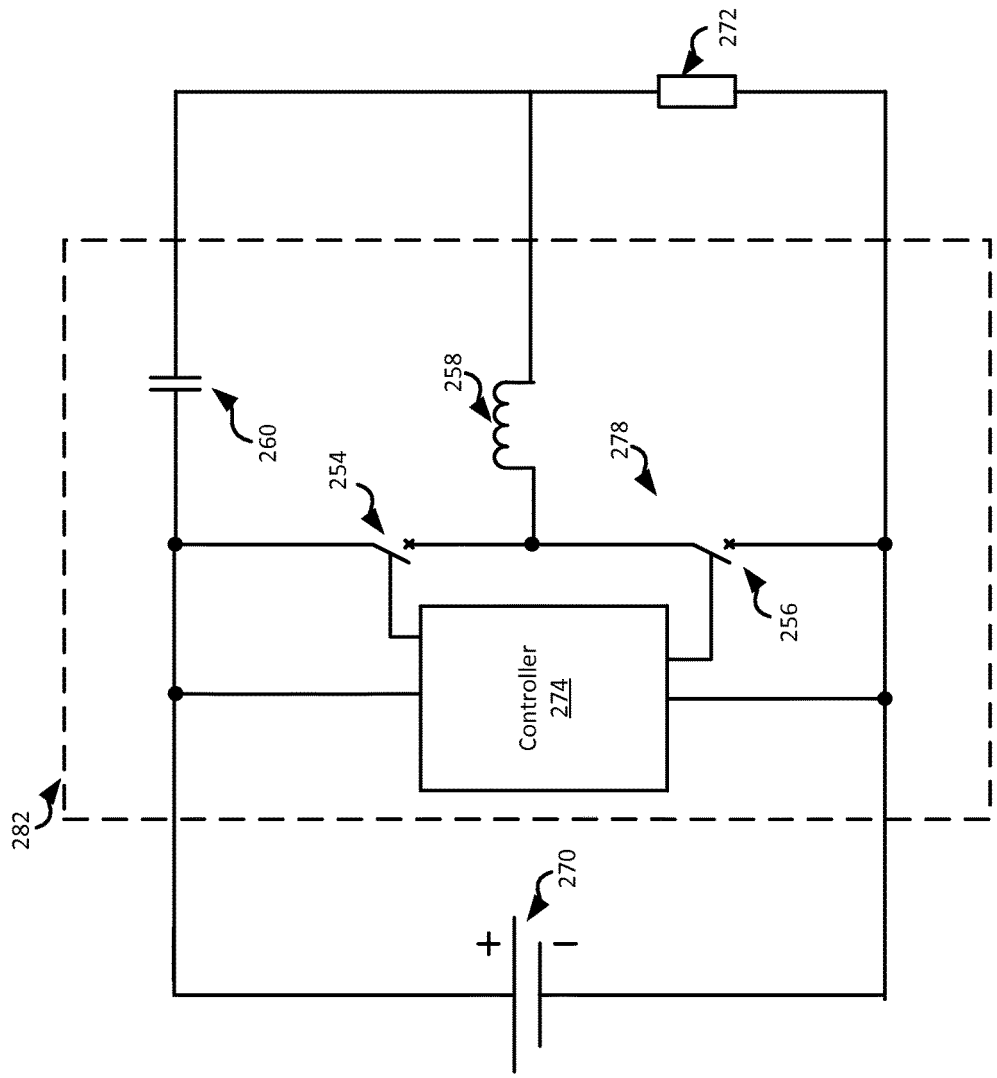
FIG. 2D is a circuit diagram of still another buck type DC to DC converter in accordance with the embodiments herein.

Buck type DC to DC converter 250 has a number functionally equivalent circuits all of which are buck type DC to DC converters and some of which are used in the embodiments herein. For example, FIG. 2C, with reference to FIGS. 1 through 2B, is a circuit diagram of buck type DC to DC converter 280 with control switch 254 connected to the negative terminal of DC power source 270 rather than the positive terminal. FIG. 2D, with reference to FIGS. 1 through 2C, is a circuit diagram of buck type DC to DC converter 282 with capacitor 260 connected to the positive terminal of DC power source 270 rather than the negative terminal as in FIG. 2B. Similarly, in another equivalent circuit, capacitor 260 of buck type DC to DC converter 280 of FIG. 2C is connected to the positive terminal of DC power source 270 rather than to the negative terminal.

DC optimizer 202 of FIG. 2A uses an asynchronous buck type DC to DC converter topology and the general principals of buck type DC to DC converter operation described above apply to it. Switch 204 and diode 206 comprise the control switch and synchronized switch, respectively. Controller 220 controls the operation of DC optimizer 202. Control switch 204 is switched between an "ON" state (conducting) and an "OFF" state (non-conducting) at a frequency of $f_{SW}$ and period T. In steady state the output voltage ($V_{OUT}$) of DC optimizer 202 depends on the ratio of the "ON" time ($T_{ON}$) of switch 204 to the switching period (T) according to the formula:

$$V_{OUT} = V_{PV} \frac{T_{ON}}{T}$$

where $V_{PV}$ is the voltage of the PV panel 240. The output voltage of DC optimizer 202 can therefore be controlled by controlling the duty cycle (D) of switch 204 where the duty cycle is defined as the ratio of $T_{ON}$ to T. The relationship of the output current ($I_{OUT}$) of DC optimizer 202 to the input current ($I_{PV}$) from PV panel 240 also depends on the duty cycle and is given by the equation.

$$I_{OUT} = I_{PV} \frac{T}{T_{ON}} = \frac{I_{PV}}{D}$$

Controller 220 operates DC optimizer 202 to maintain PV panel 240 at its maximum power point (MPP) in an embodiment. The values of PV panel output voltage and current that results in the maximum output power of a PV panel 240 are referred to as $V_{MPP}$ and $I_{MPP}$, respectively. Controller 220 also operates DC optimizer 202 such that its output current matches the string current in an embodiment. String current flows into output terminal 214 from other PV panels (e.g., $102_1, 102_2, \ldots 102_N$ of FIG. 1) in the string 100 and out of output terminal 212 to other PV panels (e.g., $102_1, 102_2, \ldots 102_N$ of FIG. 1) in the string 100.

Referring again to FIG. 1, the string current $I_{STRING}$ will be set by string inverter 120. An individual DC optimizer $104_1 \ldots 104_N$ could set the current of its counterpart PV panel $102_1 \ldots 102_N$ to the maximum power point current $I_{MPP}$ in an embodiment. The value of the duty cycle of the DC optimizer that will generate an output current to match the string current is then:

$$D = \frac{I_{MPP}}{I_{STRING}}$$

When operating at the MPP, the input voltage to the DC optimizer $104_1 \ldots 104_N$ will be the maximum power point voltage $V_{MPP}$. The output voltage of the converter will therefore be $$V_{OUT} = D \times V_{MPP}$$

Thus, the DC optimizer $104_1 \ldots 104_N$ is able to maintain the PV panel $102_1 \ldots 102_N$ at the maximum power point and match its output current to the string current by varying its duty cycle and output voltage.

Control switch 204 could be a solid state switch such as for example, a power MOSFET, a bipolar transistor or an insulated gate bipolar transistor (IGBT). Control switch 204 might also be a mechanical switch such as a relay. Diode 206 could be a silicon PN junction diode or a Schottky diode. Schottky diodes typically have lower forward voltages than silicon PN junction diodes and could result in a more efficient power conversion.

Figure 3A:
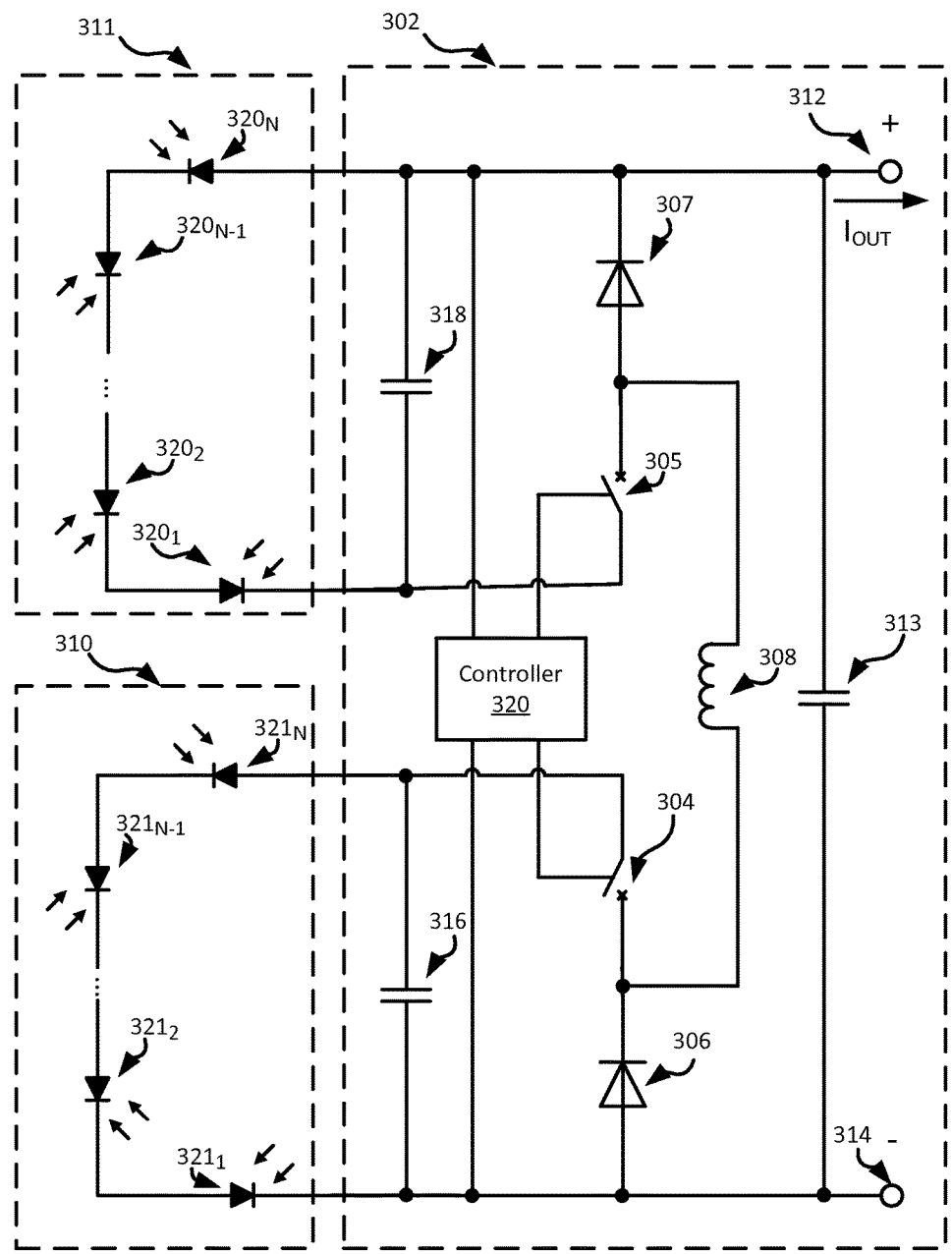
FIG. 3A is a circuit diagram of a dual source DC optimizer coupled to two PV panels according to an embodiment herein.

FIG. 3A, with reference to FIGS. 1 through 2D, is a circuit diagram of one embodiment of a dual source DC optimizer 302 coupled to two PV panels 310, 311. DC optimizer 302 provides power optimization for PV panels 310, 311. More generally, one DC optimizer 302 optimizes the output of two mutually independent power sources, such as PV panels 310, 311. DC optimizer 302 comprises control switches 304, 305, diodes 306, 307, inductor 308, capacitor 313, input capacitors 316, 318, controller 320, and output terminal pair 312, 314. DC optimizer 302 operatively connects to the remaining PV panels (e.g., $102_1, 102_2, \ldots 102_N$ of FIG. 1) in the string 100 at output terminal pair 312, 314 (the remaining PV panels in the string have not been shown for clarity). PV panel 310 comprises solar cells $321_1 \ldots 321_N$ connected in series, and PV panel 311 comprises solar cells $320_1 \ldots 320_N$ connected in series. Controller 320 controls the conduction state of control switches 304, 305. Control switches 304, 305 could be solid state switches such as for example, power MOSFETs, bipolar transistors, or IGBTs. Control switches 304, 305 could also be electromechanical switches such as electromechanical relays. Diodes 306, 307 could be junction diodes or Schottky diodes. Schottky diodes typically have lower forward voltages than junction diodes and could have reduced power losses resulting in more efficient power conversion. In one embodiment, control switches 304, 305 comprise N type power MOSFETS and diodes 306, 307 comprise Schottky diodes. Input capacitors 316, 318 provide energy storage and smoothing for PV panels 310, 311. Input capacitors 316, 318 might not be required in other embodiments using different types of power sources with built in capacitance, such as for example, a battery. In one example embodiment, inductor 308 has a value of approximately 10 µH, capacitor 313 has a value of approximately 50 µF, input capacitors 316, 318 have values of approximately 50 µF, and the switching frequency of DC optimizer 302 is approximately 250 kHz.

The power of PV panel 310 is controlled and optimized by the switching of control switches 304 and the power of PV panel 311 is controlled and optimized by the switching of control switch 305. Control switches 304, 305 are operated independently from one another but share inductor 308 and capacitor 313. Control switch 304 in combination with inductor 308, capacitor 313 and diode 306 forms an asynchronous buck type DC to DC converter which converts the DC voltage of PV panel 310 to an equal or lower voltage. In this embodiment diode 306 fulfils the role of the buck type DC to DC converter's synchronous switch. The output current and output voltage of this buck type DC to DC converter is controlled by the duty cycle of switch 304. Control switch 305 in combination with inductor 308, capacitor 313, and diode 307 forms a separate and independent buck type DC to DC converter which converts the DC voltage of PV panel 311 to an equal or lower voltage. In this embodiment diode 307 fulfils the role of the buck type DC to DC converter's synchronous switch. The output current and output voltage of this separate buck type DC to DC converter is controlled by the duty cycle of control switch 305.

Figure 3B:
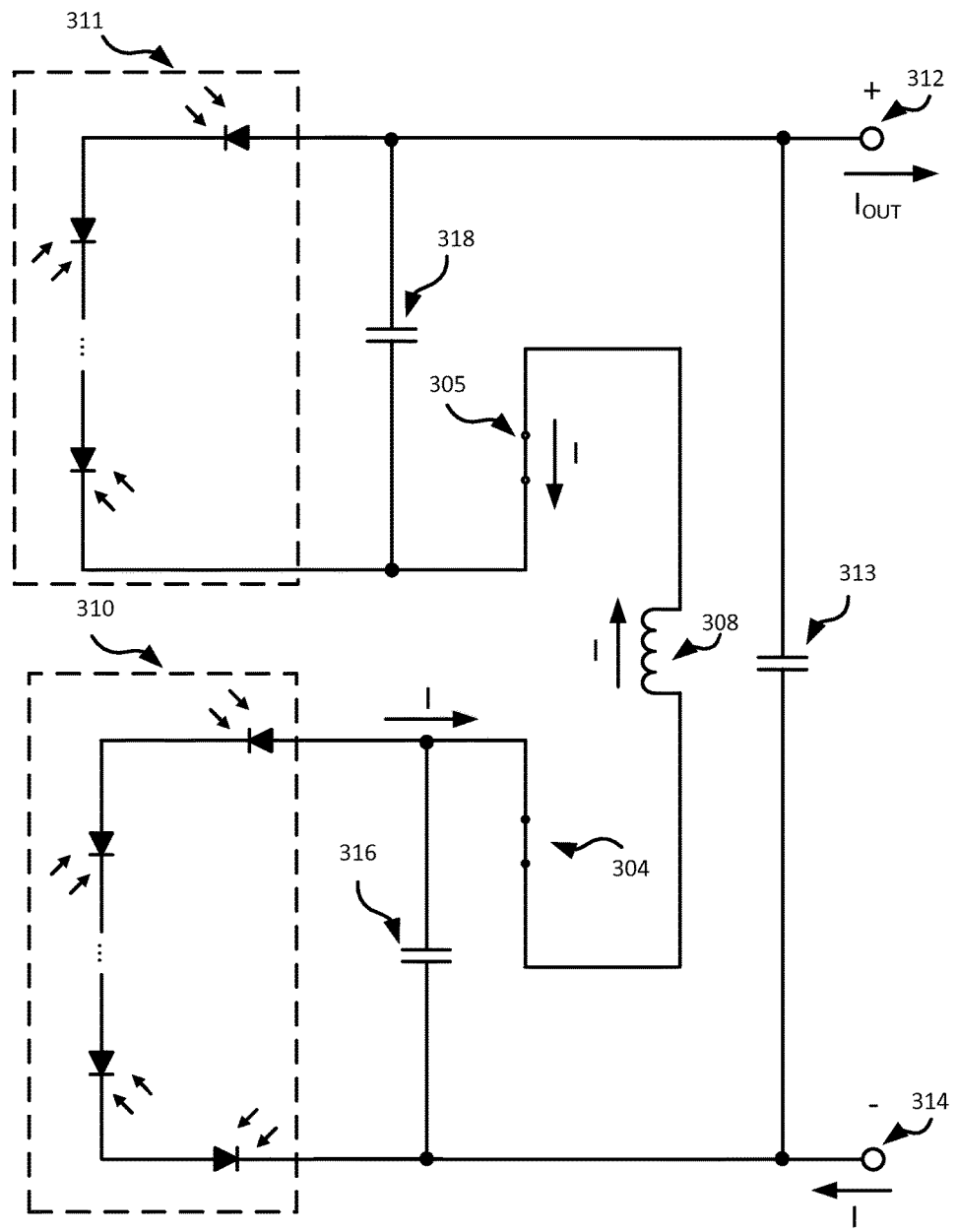
FIG. 3B is a circuit diagram of an equivalent circuit showing the operation of a DC optimizer during the conduction phase of a switch when the switch is closed according to an embodiment herein.

FIG. 3B, with reference to FIGS. 1 through 3A, is a circuit diagram of an equivalent circuit showing the operation of DC optimizer 302 during the conduction phase of control switch 304 when control switch 305 is closed. Control switches 304 is closed and current from PV panel 310 flows through it, closed control switch 305, PV panel 311, and output terminal pair 312, 314. Diode 306 of FIG. 3A is reverse biased and non-conducting and has not been shown in FIG. 3B. Diode 307 of FIG. 3A is reverse biased by the voltage of PV panel 311 and is non-conducting and has not been shown in FIG. 3B.

Figure 3C:
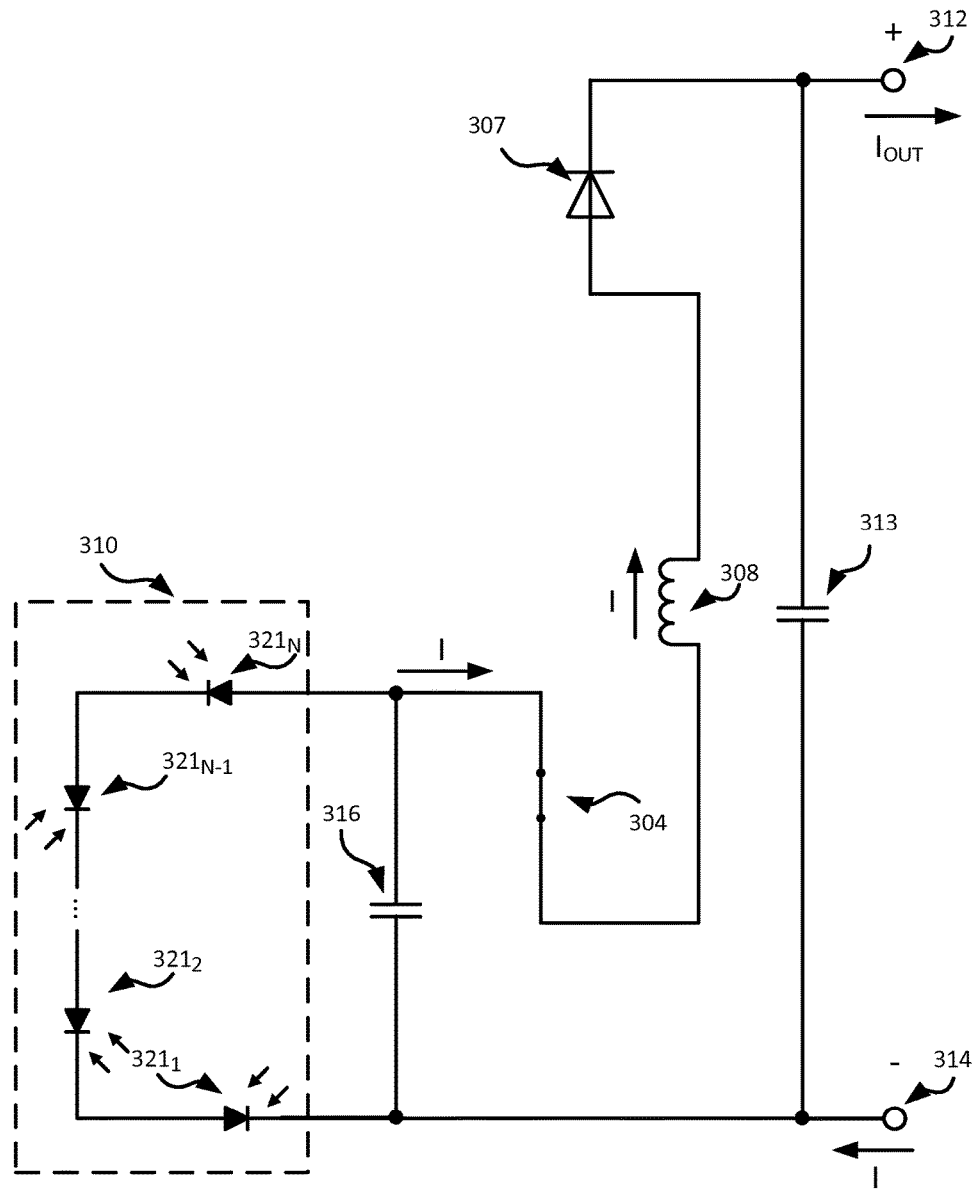
FIG. 3C is a circuit diagram of an equivalent circuit showing the operation of a DC optimizer during the conduction phase of a switch when the switch is open according to an embodiment herein.

FIG. 3C, with reference to FIGS. 1 through 3B, is a circuit diagram of an equivalent circuit showing the operation of DC optimizer 302 during the conduction phase of control switch 304 when control switch 305 is open. Control switch 304 is closed and current from PV panel 310 flows through it, inductor 308, forward biased diode 307, and output terminal pair 312, 314. Diode 306 of FIG. 3A is reverse biased and non-conducting and has not been shown in FIG. 3C. Control switch 305 of FIG. 3A is open and non-conducting and has not been shown in FIG. 3C.

Figure 3D:
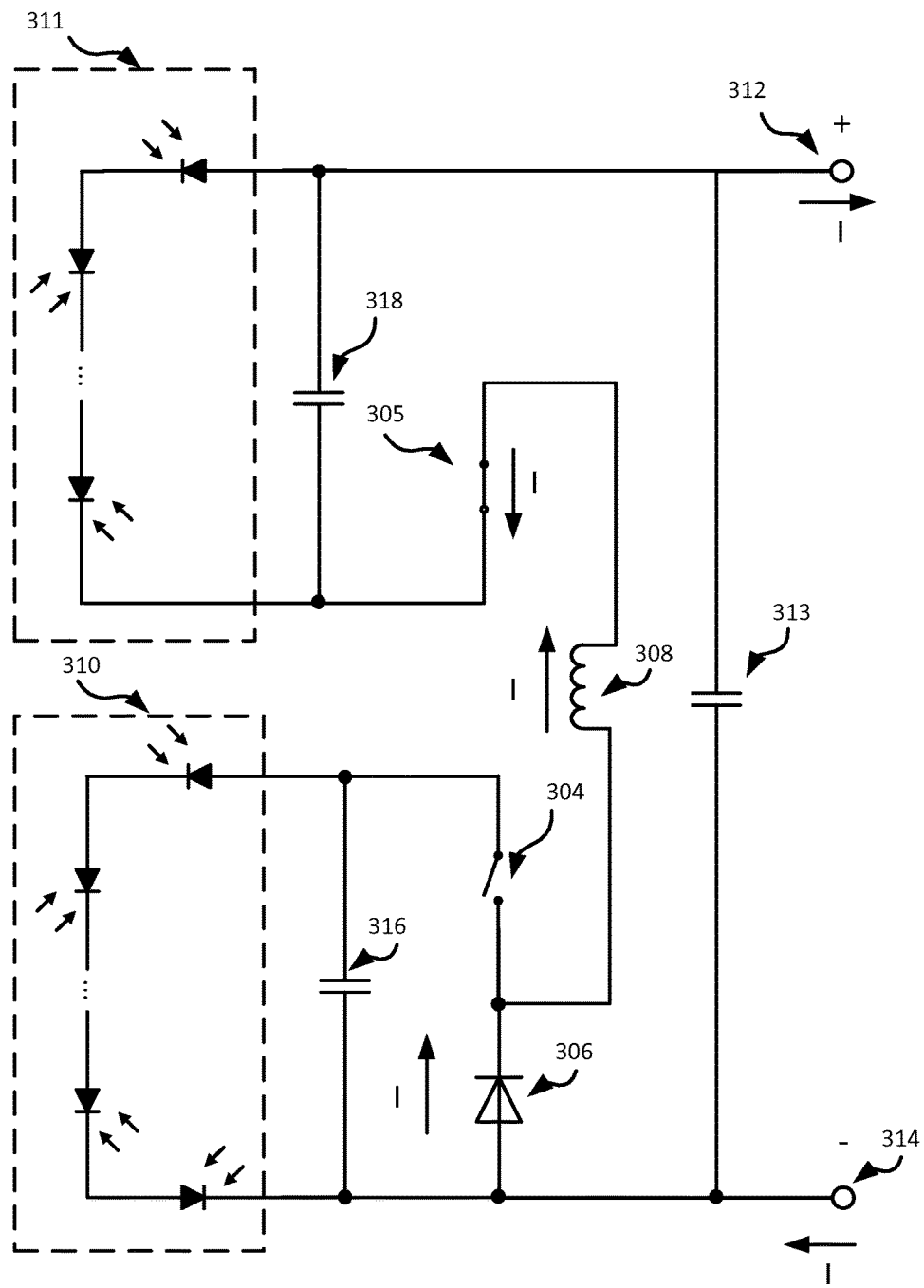
FIG. 3D is a circuit diagram of an equivalent circuit showing the operation of a DC optimizer during the non-conduction phase of a switch when the switch is conducting according to an embodiment herein.

FIG. 3D, with reference to FIGS. 1 through 3C, is a circuit diagram of an equivalent circuit showing the operation of DC optimizer 302 during the non-conduction phase of control switch 304 when control switch 305 is conducting. Control switch 304 is open and non-conducting; however, energy stored in inductor 308 during the conduction phase of control switch 304 causes current to continue to flow. Current could also flow from PV panel 311. Current flows through closed control switch 305, PV panel 311, output terminal pair 312, 314, and forward biased diode 306. Diode 307 of FIG. 3A is reverse biased by PV panel 311 and is non-conducting and has not been shown in FIG. 3D. In some embodiments, the energy stored in inductor 308 could be completely discharged during this phase and the current could become zero.

Figure 3E:
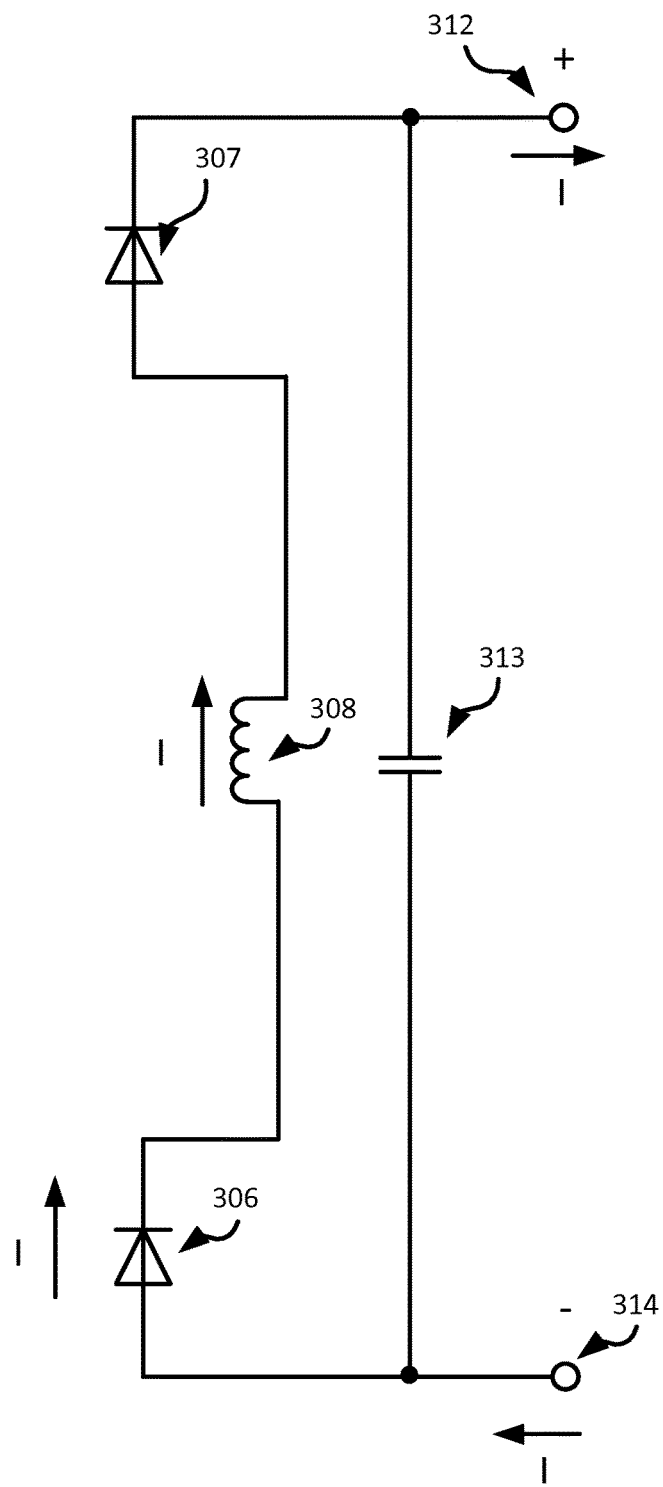
FIG. 3E is a circuit diagram of an equivalent circuit showing the operation of a DC optimizer during the non-conduction phase of a switch when the switch is non-conducting according to an embodiment herein.

FIG. 3E, with reference to FIGS. 1 through 3D, is a circuit diagram of an equivalent circuit showing the operation of DC optimizer 302 during the non-conduction phase of control switch 304 when control switch 305 is also non-conducting. Control switches 304, 305 are open and non-conducting and have not been shown in FIG. 3E. PV panels 310, 311 are isolated by open control switches 304, 305 and have also not been shown. However, energy stored in inductor 308 during the conduction phases of control switches 304, 305 causes current to continue to flow. Current flows from inductor 308 through forward biased diode 307, output terminal pair 312, 314, and forward biased diode 306. In some embodiments, the energy stored in inductor 308 could be completely discharged during this phase and the current could become zero.

Figure 3F:
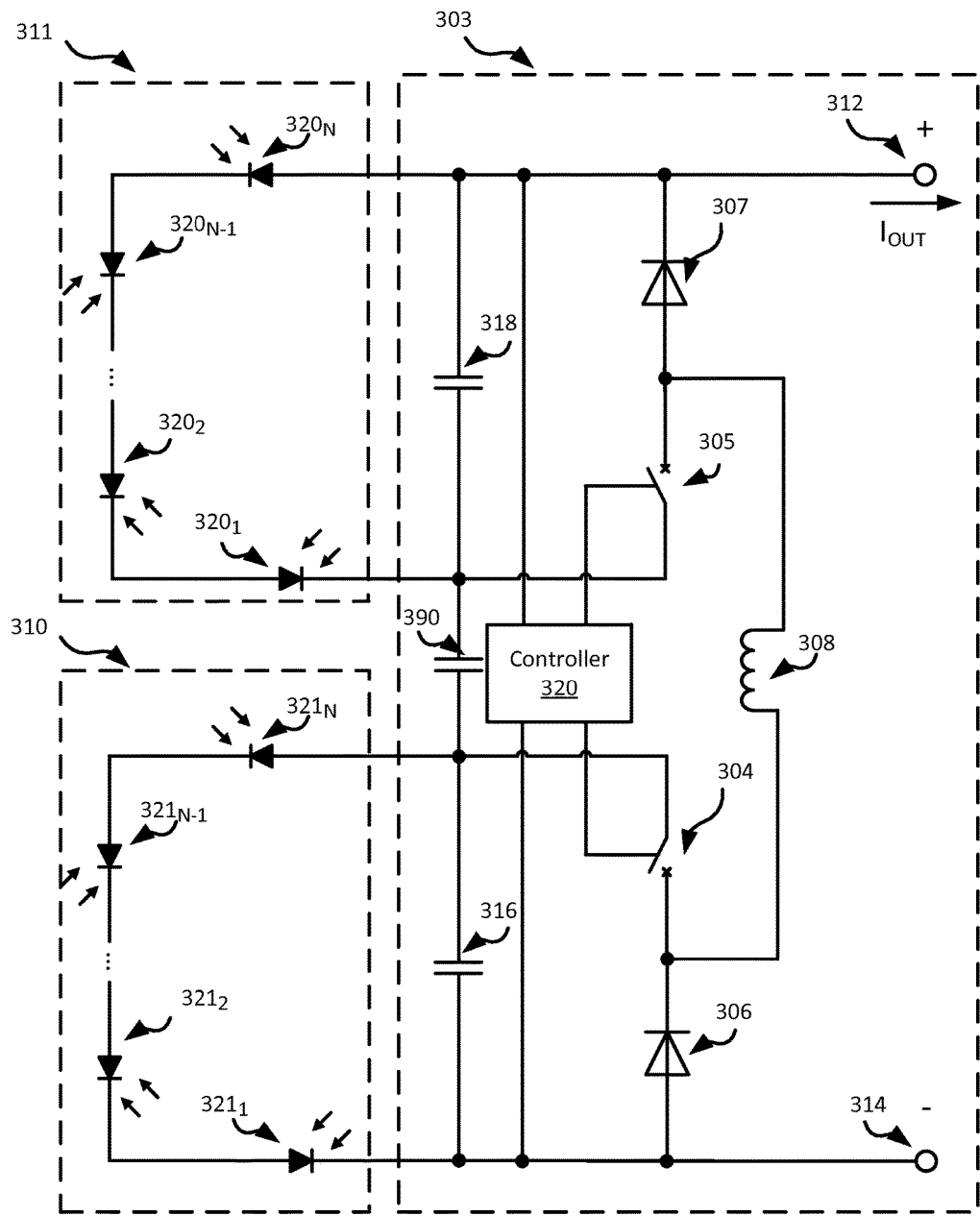
FIG. 3F is a circuit diagram of another DC optimizer coupled to two PV panels according to an embodiment herein.

FIG. 3F, with reference to FIGS. 1 through 3E, is a circuit diagram of another DC optimizer 303 coupled to two PV panels 310, 311. DC optimizer 303 provides power optimization for PV panels 310, 311. DC optimizer 303 comprises control switches 304, 305, diodes 306, 307, inductor 308, smoothing capacitor 390, input capacitors 316, 318, controller 320, and output terminal pair 312, 314. DC optimizer 303 operatively connects to the remaining PV panels (e.g., 102$_1$, 102$_2$, . . . 102$_N$ of FIG. 1) in the string 100 at output terminal pair 312, 314 (the remaining PV panels in the string have not been shown for clarity of illustration). Controller 320 controls the conduction state of control switches 304, 305. Control switches 304, 305 could be solid state switches such as for example, power MOSFETs, bipolar transistors, or IGBTs. Control switches 304, 305 could also be electromechanical switches such as electromechanical relays. Diodes 306, 307 could be junction diodes or Schottky diodes. Schottky diodes typically have lower forward voltages than junction diodes and could have reduced power losses resulting in more efficient power conversion. In one embodiment, control switches 304, 305 are N type power MOSFETS and diodes 306, 307 are Schottky diodes. Input capacitors 316, 318 provide energy storage and smoothing. Input capacitors 316, 318 might not be required in other embodiments using different types of power sources with built in capacitance, such as for example, a battery. In one example embodiment inductor 308 has a value of approximately 10 μH, smoothing capacitor 390 has a value of approximately 50 μF, input capacitors 316, 318 have values of approximately 50 μF, and the switching frequency of optimizer 303 is approximately 250 kHz.

Similar to DC optimizer 302, the power of PV panel 310 is controlled and optimized by the switching of control switch 304 and the power of PV panel 311 is controlled and optimized by the switching of control switch 305. Control switches 304, 305 are operated independently from one another but share inductor 308 and smoothing capacitor 390. Control switch 304 in combination with inductor 308, smoothing capacitor 390 and diode 306 forms an asynchronous buck type DC to DC converter which converts the DC voltage of PV panel 310 to an equal or lower voltage. In this embodiment diode 306 fulfils the role of the buck type DC to DC converter's synchronous switch. The output current and output voltage of this buck type DC to DC converter is controlled by the duty cycle of control switch 304 ($D_1$). Control switch 305 in combination with inductor 308, smoothing capacitor 390 and diode 307 forms a separate and independent buck type DC to DC converter, which converts the DC voltage of PV panel 311 to an equal or lower voltage. In this embodiment diode 306 fulfils the role of the buck type DC to DC converter's synchronous switch. The output voltage of this buck type DC to DC converter is controlled by the duty cycle of control switch 305 ($D_2$).

The voltage across smoothing capacitor 390 ($V_C$) in DC optimizer 303 is given by the formula:

$$V_C = V_{PV1}(D_1-1) + V_{PV2}(D_2-1)$$

where $V_{PV1}$ and $V_{PV2}$ are the output voltages of PV panels 310, 311, respectively. When PV panels 310, 311 are in full sunlight the duty factors of control switches 304, 305 in DC optimizer 303 will be close to 100% and the voltage across smoothing capacitor 390 will be close to zero. When PV panels 310, 311 are heavily shaded or receiving low amounts of insolation the duty factors of control switches 304, 305 in DC optimizer 303 will be close to 0% and the voltage across smoothing capacitor 390 will be close to $V_{PV1}+V_{PV2}$; however, at low insolation values $V_{PV1}$ and $V_{PV2}$ could be significantly lower than their values in full sunlight (high insolation).

In contrast, the voltage across capacitor 313 ($V_{COUT}$) of DC optimizer 302 is:

$$V_{COUT} = V_{PV1}D_1 + V_{PV2}D_2$$

When PV panels 310, 311 are in full sunlight the duty factors of control switches 304, 305 in DC optimizer 302 will be close to 100% and the voltage across smoothing capacitor 390 will be close to $V_{PV1}+V_{PV2}$. DC optimizer 303 could have an advantage over DC optimizer 302. Smoothing capacitor 390 in DC optimizer 303 could be subject to a reduced voltage relative to capacitor 313 in DC optimizer 302 when PV panels 310, 311 are operating in full sunlight. Consequently, smoothing capacitor 390 could have improved reliability and/or a less expensive type of capacitor could be used versus capacitor 313.

Figure 4A:
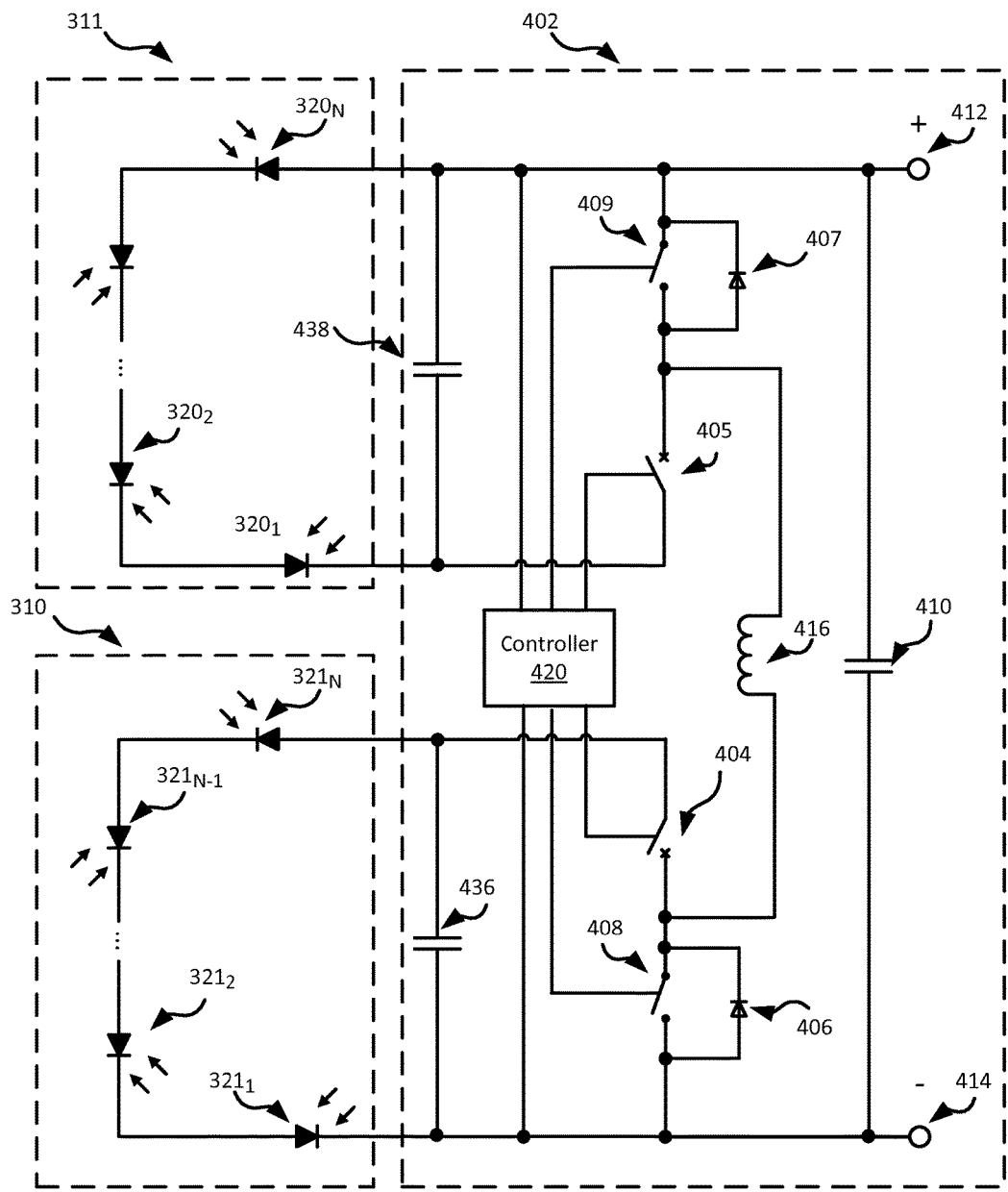
FIG. 4A is a circuit diagram of another dual source DC optimizer according to an embodiment herein.

FIG. 4A, with reference to FIGS. 1 through 3F, is a circuit diagram of another dual source DC optimizer 402. DC optimizer 402 provides power optimization for PV panels 310, 311. More generally, one DC optimizer 402 optimizes the output of two mutually independent power sources, such as PV panels 310, 311. DC optimizer 402 comprises control switches 404, 405, synchronous switches 408, 409, diodes 406, 407, inductor 416, capacitor 410, input capacitors 436, 438, controller 420, and output terminal pair 412, 414. DC optimizer 402 operatively connects to the remaining PV panels (e.g., 102$_1$, 102$_2$, . . . 102$_N$ of FIG. 1) in the string 100 at output terminal pair 412, 414 (the remaining PV panels in the string have not been shown for clarity of illustration).

Controller 420 controls the operation of control switches 404, 405 and synchronous switches 408, 409. Control switches 404, 405 and synchronous switches 408, 409 could be solid state switches such as for example, power MOS- FETs, bipolar transistors, or IGBTs. They could also be electromechanical switches such as relays. Diodes 406, 407 could be silicon PN junction diode or Schottky diodes. In one embodiment control switches 404, 405 and synchronous switches 408, 409 are N type power MOSFETS and diodes 406, 407 are Schottky diodes. In another embodiment, control switches 404, 405 and synchronous switches 408, 409 are N type power MOSFETS and diodes 406, 407 are the intrinsic body diodes of the power MOSFETS and are not separate and discrete devices. Input capacitors 436, 438 provide energy storage and smoothing for PV panels 310, 311. Input capacitors 436, 438 might not be required in other embodiments using different types of power sources with built in capacitor, such as for example, a battery.

In one example embodiment inductor 416 has a value of approximately 10 µH, capacitor 410 has a value of approximately 50 µF, input capacitors 436, 438 have values of approximately 50 µF, and the switching frequency of DC optimizer 402 is approximately 250 kHz.

The power of PV panel 310 is controlled and optimized by the switching of control switch 404 and synchronous switch 408. The power of PV panel 311 is controlled and optimized by the switching of control switch 405 and synchronous switch 409. Control witch 404 and synchronous switch 408 in combination with inductor 308 and capacitor 410 form a synchronous buck type DC to DC converter whose input is PV panel 310 and whose output voltage is controlled by the duty cycle of control switch 404. Control switches 404 and synchronous switch 408 form a complementary switch pair. When control switch 404 is ON and conducting, synchronous switch 408 is OFF and non-conducting. Moreover, when control switch 404 is OFF, synchronous switch 408 is ON and conducting.

Control switch 405 and synchronous switch 409 in combination with inductor 416 and capacitor 410 form a separate and independent synchronous buck type DC to DC converter whose input is PV panel 311 and whose output voltage is controlled by the duty cycle of control switch 405. Control switch 405 and synchronous switch 409 form a complementary switch pair. When control switch 405 is ON, synchronous switch 409 is OFF and non-conducting. Moreover, when control switch 405 is OFF, synchronous switch 409 is ON and conducting.

Diodes 406, 407 in DC optimizer 402 could perform a similar role to diodes 306 and 307 in DC optimizer 302. Diode 407 could complete the circuit path from PV panel 310 through inductor 416 to output terminal pair 412, 414 and capacitor 410 when control switch 404 is conducting and control switch 405 is non-conducting and before synchronous switch 409 is fully switched ON. Diode 406 could complete the circuit path from PV panel 311 through inductor 416 to output terminal pair 412, 414 and capacitor 410 when control switch 405 is conducting and control switch 404 is non-conducting and before synchronous switch 408 is fully switched ON.

Figure 4B:
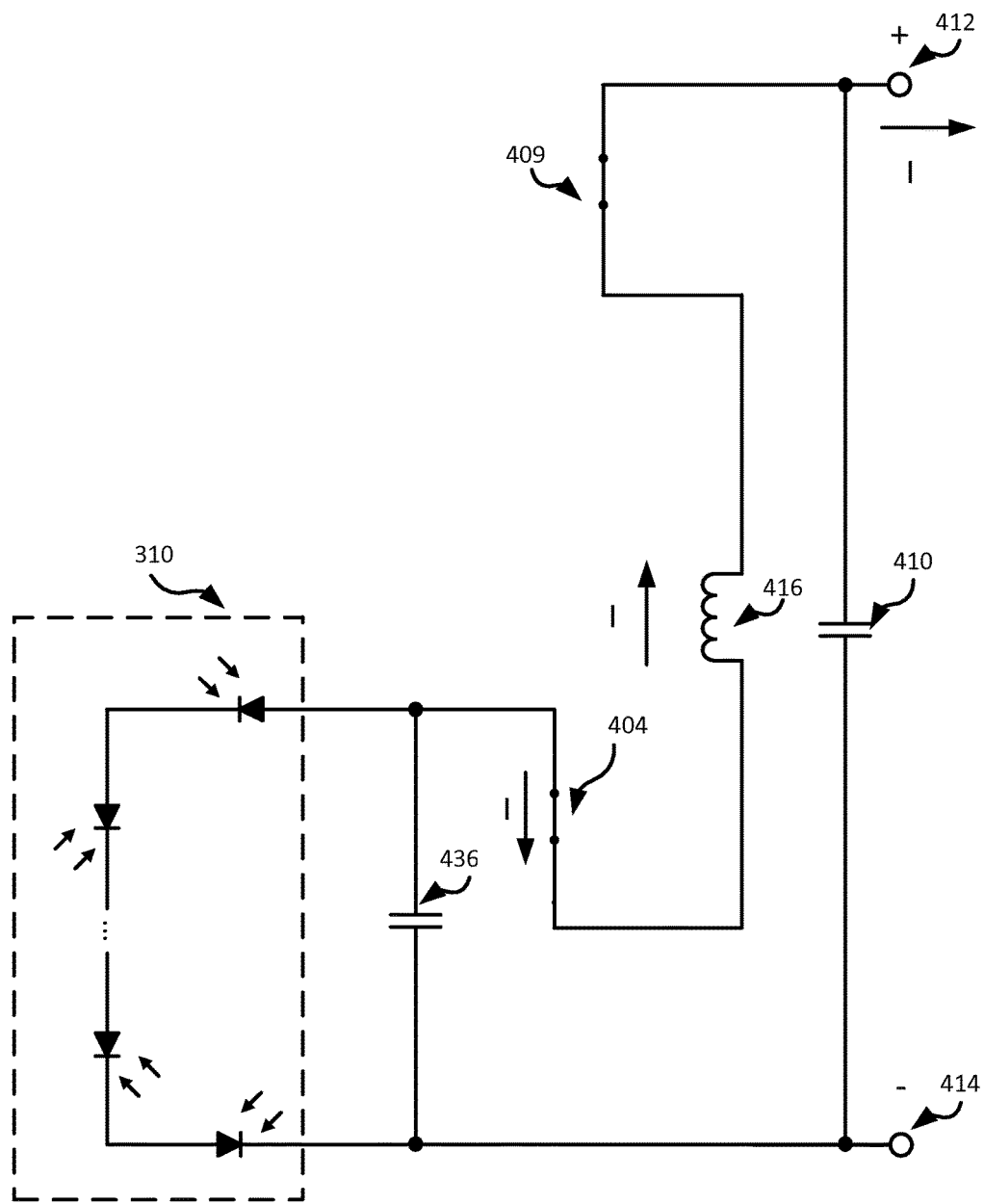
FIG. 4B is a circuit diagram of an equivalent circuit showing the operation of a DC optimizer during the conduction phase of a switch when the switch is open according to an embodiment herein.

FIG. 4B, with reference to FIGS. 1 through 4A, is a circuit diagram of an equivalent circuit showing the operation of DC optimizer 402 during the conduction phase of control switch 404 when control switch 405 is open. Current from PV panel 310 flows through control switch 404, inductor 416, synchronous switch 409, and into output terminal pair 412, 414. Synchronous switch 409 is closed since its state is complementary to control switch 405. Synchronous switch 408 of FIG. 4A is controlled to be in a complementary state to control switch 404 and is therefore OFF and non-conducting and has not been shown in FIG. 4B. Control switch 405 of FIG. 4A has also not been shown in FIG. 4B since it is OFF and non-conducting.

Figure 4C:
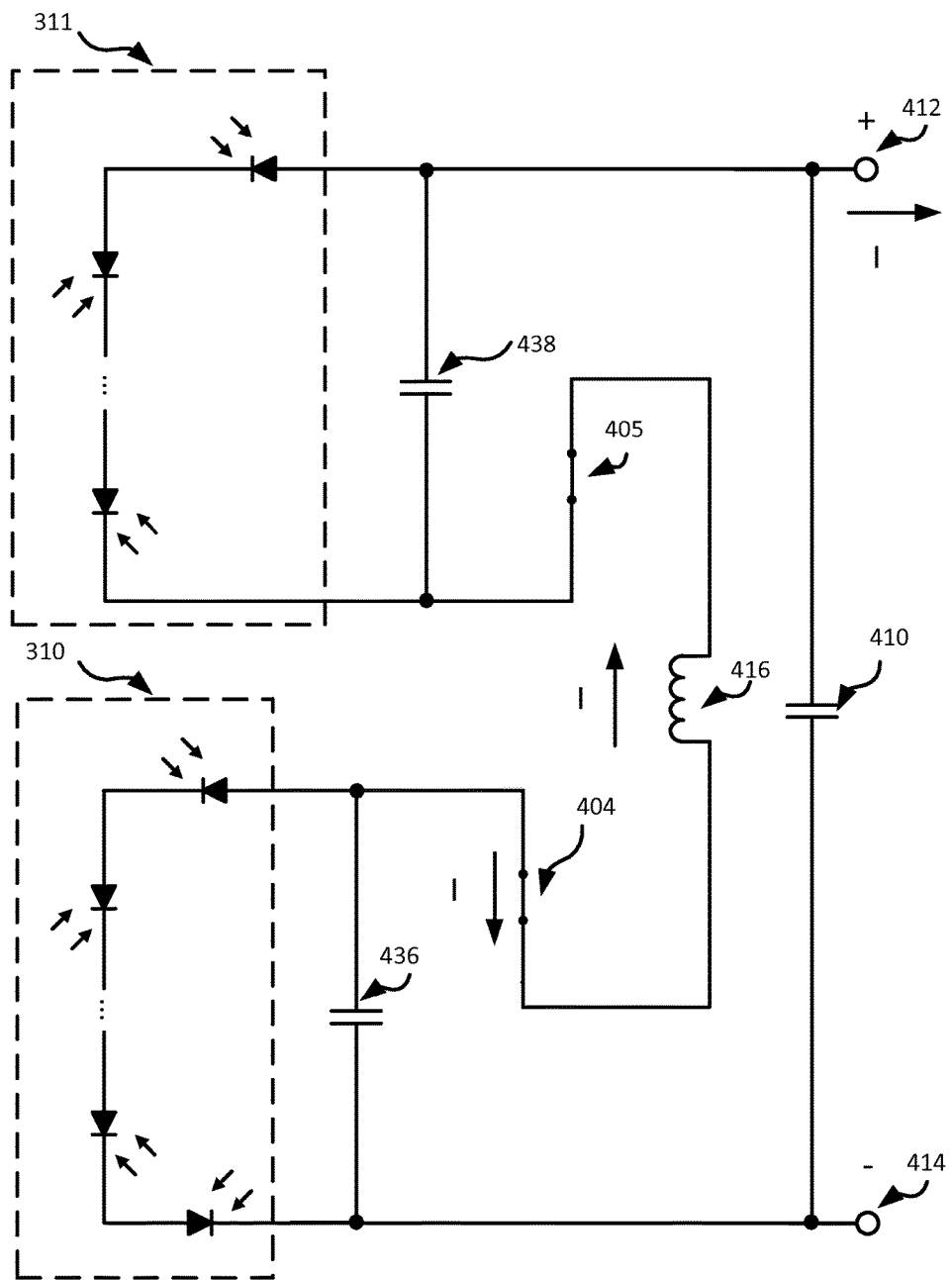
FIG. 4C is a circuit diagram of an equivalent circuit showing the operation of a DC optimizer during the conduction phase of a switch when the switch is closed according to an embodiment herein.

FIG. 4C, with reference to FIGS. 1 through 4B, is a circuit diagram of an equivalent circuit showing the operation of DC optimizer 402 during the conduction phase of control switch 404 when control switch 405 is closed. Current from PV panel 310 flows through control switch 404, inductor 416, control switch 405, PV panel 311, and into output terminal pair 412, 414. Synchronous switch 409 of FIG. 4A is open since its state is complementary to the state of control switch 405 and has not been shown in FIG. 4C. Synchronous switch 408 of FIG. 4A is controlled to be in a complementary state to control switch 404 and is therefore OFF and non-conducting and has not been shown in FIG. 4C.

Figure 4D:
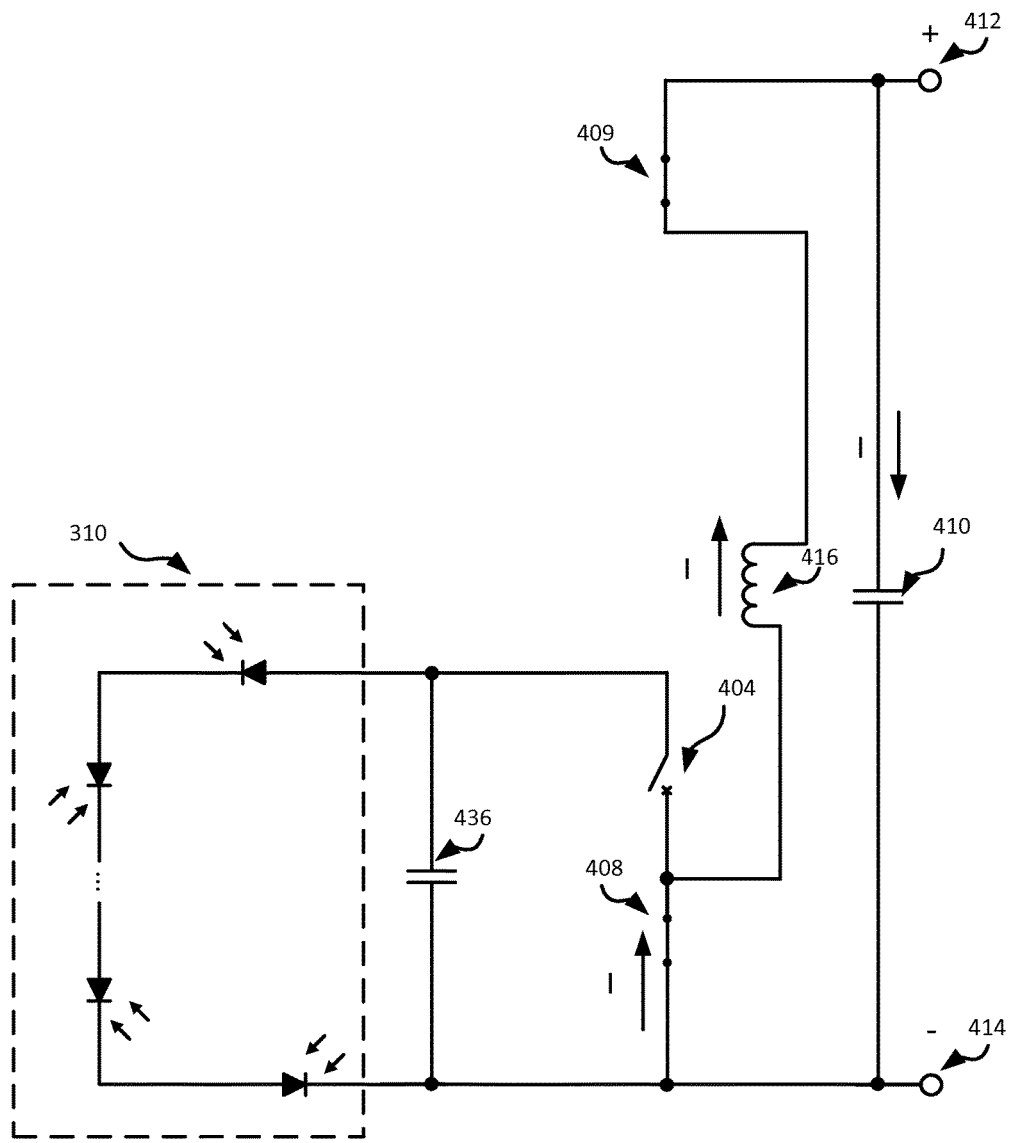
FIG. 4D is a circuit diagram of an equivalent circuit showing the operation of a DC optimizer during the non-conduction phase of a switch and the conducting phase of the switch when the switch is open according to an embodiment herein.

FIG. 4D, with reference to FIGS. 1 through 4C, is a circuit diagram of an equivalent circuit showing the operation of DC optimizer 402 during the non-conduction phase of control switch 404 and the conducting phase of synchronous switch 408 when control switch 405 is open. Control switch 404 is open and non-conducting and synchronous switch 408 is closed and conducting. Energy stored in inductor 416 during the conduction phase of control switch 404 causes current to continue to flow. Current flows through closed synchronous switch 409, output terminal pair 412, 414, and closed switch 408. Control switch 405 of FIG. 4A is open and has not been shown in FIG. 4D. In some embodiments, the energy stored in inductor 416 could be completely discharged during this phase and the current could become zero.

Figure 4E:
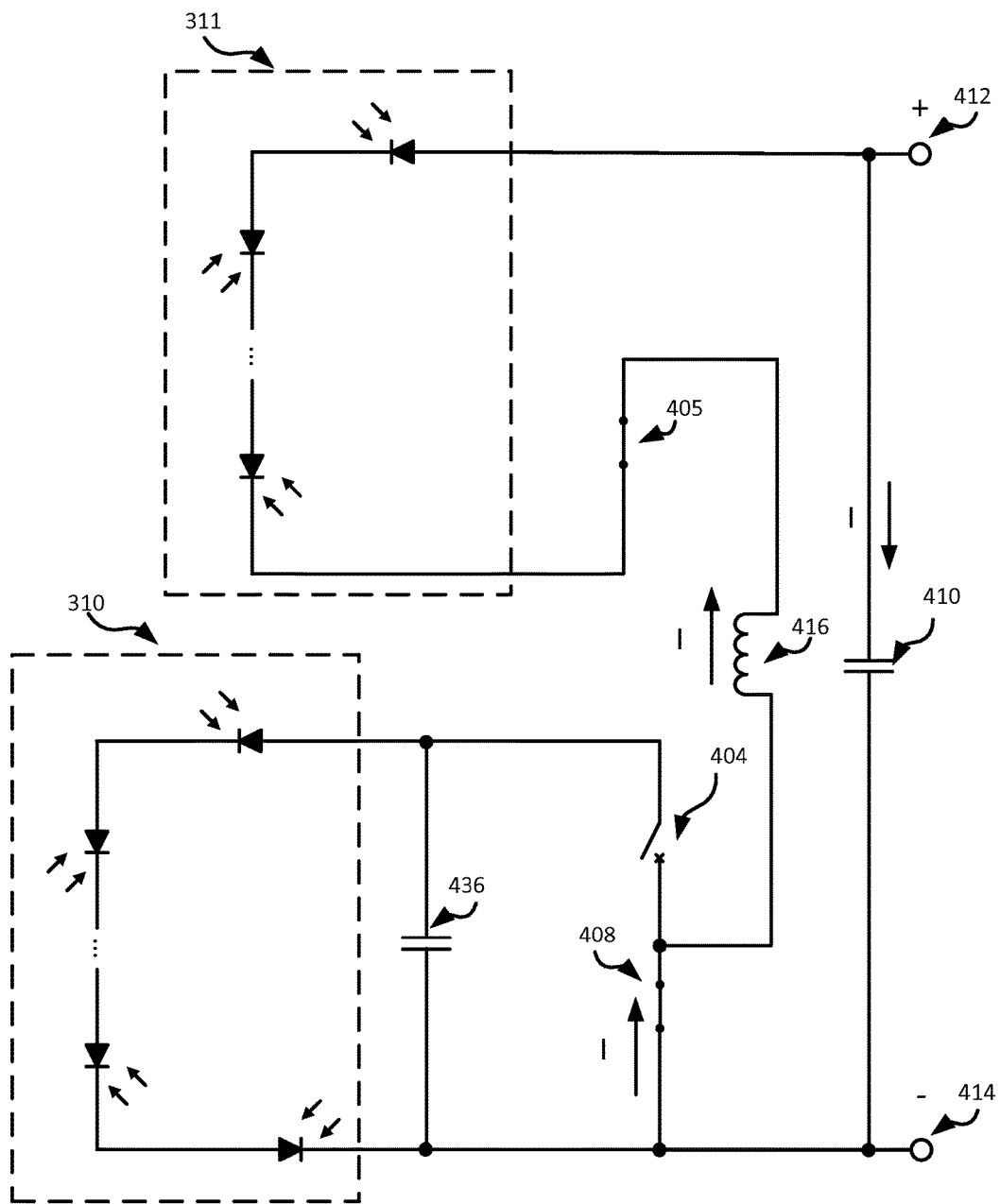
FIG. 4E is a circuit diagram of an equivalent circuit showing the operation of a DC optimizer during the non-conduction phase of a switch and the conducting phase of the switch when the switch is closed according to an embodiment herein.

FIG. 4E, with reference to FIGS. 1 through 4D, is a circuit diagram of an equivalent circuit showing the operation of DC optimizer 402 during the non-conduction phase of control switch 404 and the conducting phase of synchronous switch 408 when control switch 405 is closed. Control switch 404 is open and non-conducting and synchronous switch 408*is* closed and conducting. Energy stored in inductor 416 during the conduction phase of control switch 404 causes current to continue to flow. Current could also flow from PV panel 311. Current flows from inductor 416 and PV panel 311 through control switch 405, PV panel 311, output terminal pair 412, 414, and closed synchronous switch 408. Synchronous switch 409 of FIG. 4A is open and has not been shown in FIG. 4E. In some embodiments, the energy stored in inductor 416 could be completely discharged during this phase and the current could become zero.

DC optimizer 402 could have improved power efficiency over DC optimizer 302 at low power levels due to its synchronous nature. Synchronous switches 408, 409 of DC optimizer 402 eliminate power losses due to the voltage drop across forward biased diodes 306, 307 of DC optimizer 302. At low power levels the duty cycle of control switches 304, 305 is low and diodes 306, 307 will be forward biased and conducting for the majority of the buck switching period. If diodes 306, 307 are Schottky diodes with forward bias voltages of approximately 0.3 V and if the string current is approximately 8 Amperes, then the combined power dissipation of diodes 306, 307 is approximately 4.8 Watts.

Figure 4F:
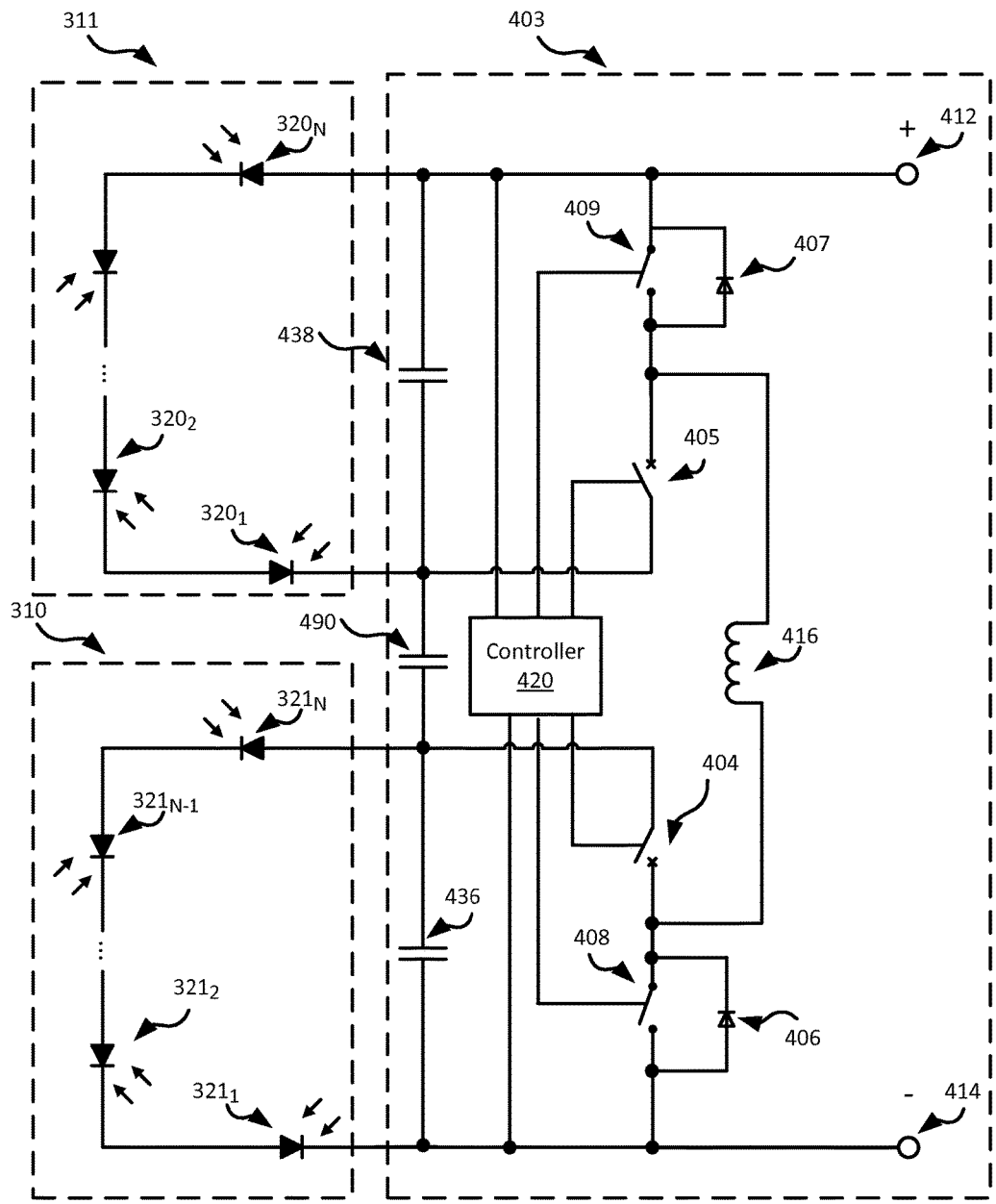
FIG. 4F is a circuit diagram of another dual source DC optimizer according to an embodiment herein.

FIG. 4F, with reference to FIGS. 1 through 4E, is a circuit diagram of another dual source DC optimizer 403. DC optimizer 403 provides power optimization for PV panels 310, 311. More generally, one DC optimizer 403 optimizes the output of two mutually independent power sources, such as PV panels 310, 311. DC optimizer 403 comprises control switches 404, 405, synchronous switches 408, 409, diodes 406, 407, inductor 416, smoothing capacitor 490, input capacitors 436, 438, controller 420, and output terminal pair 412, 414. DC optimizer 303 operatively connects to the remaining PV panels (e.g., $102_1$, $102_2$, ... $102_N$ of FIG. 1) in the string 100 at output terminal pair 412, 414 (the remaining PV panels in the string have not been shown for clarity of illustration).

Controller 420 controls the operation of control switches 404, 405 and synchronous switches 408, 409. Control switches 404, 405 and synchronous switches 408, 409 could be solid state switches such as for example, power MOSFETs, bipolar transistors, or IGBTs. They could also be electromechanical switches such as relays. Diodes 406, 407 could be silicon PN junction diode or Schottky diodes. In one embodiment control switches 404, 405 and synchronous switches 408, 409 are N type power MOSFETS and diodes 406, 407 are Schottky diodes. In another embodiment, control switches 404, 405 and synchronous switches 408, 409 are N type power MOSFETS and diodes 406, 407 are the intrinsic body diodes of the power MOSFETS and are not separate and discrete devices. Input capacitors 436, 438 provide energy storage and smoothing for PV panels 310, 311. Input capacitors 436, 438 might not be required in other embodiments using different types of power sources with built in capacitance, such as for example, a battery.

In one example embodiment inductor 416 has a value of approximately 10 µH, capacitor 410 has a value of approximately 50 µF, input capacitors 436, 438 have values of approximately 50 µF, and the switching frequency of DC optimizer 413 is approximately 250 kHz.

The power of PV panel 310 is controlled and optimized by the switching of control switch 404 and synchronous switch 408. The power of PV panel 311 is controlled and optimized by the switching of control switch 405 and synchronous switch 409. Control switches 404 and synchronous switch 408 in combination with inductor 416 and smoothing capacitor 490 form a synchronous buck type DC to DC converter whose input is PV panel 310 and whose output voltage is controlled by the duty cycle of control switch 404. Switches 404, 408 form a complementary switch pair. When control switch 404 is ON and conducting, synchronous switch 408 is OFF and non-conducting. Moreover, when control switch 404 is OFF and non-conducting, synchronous switch 408 is ON and conducting.

Control switch 405 and synchronous switch 409 in combination with inductor 416 and smoothing capacitor 490 form a separate and independent synchronous buck type DC to DC converter whose input is PV panel 311 and whose output voltage is controlled by the duty cycle of control switch 405. Control switch 405 and synchronous switch 409 form a complementary switch pair. When control switch 405 is ON and conducting, synchronous switch 409 is OFF and non-conducting. Moreover, when control switch 405 is OFF and non-conducting, synchronous switch 409 is ON and conducting.

Similar to smoothing capacitor 390 in DC optimizer 303 of FIG. 3F, smoothing capacitor 490 in DC optimizer 403 of FIG. 4F will experience a voltage approaching zero when PV panels 310, 311 are in full sunlight. In contrast, capacitor 410 of DC optimizer 402 of FIG. 4A will experience a voltage close to $V_{PV1}+V_{PV2}$.

DC optimizer 403 could therefore have an advantage over DC optimizer 402. Smoothing capacitor 490 could see a reduced voltage relative to capacitor 410 when their PV panels 310, 311 are operating in full sunlight. Consequently, smoothing capacitor 490 could have improved reliability and/or a less expensive type of capacitor could be used versus capacitor 410.

Dual source DC optimizers 302, 303, 402, 403 could have cost and size advantages over a single PV panel DC optimizer such as DC optimizer 202. DC optimizers 302, 402 share inductor 308, 416, capacitor 313, 410, and controller 320, 420. DC optimizers 303, 403 share inductor 308, 416, smoothing capacitor 390, 490, and controller 320, 420. Furthermore, DC optimizers 302, 303, 402, 403 could be packaged in a single enclosure and shared between adjacent PV panels which could also result in cost savings over two separately packaged, single PV panel DC optimizers.

DC optimizers 302, 303, 402, 403 could be useful for other power sources beyond PV panels. DC optimizers 302, 303, 402, 403 could be useful to optimize the power of any pair of mutually independent power generators whose outputs are not perfectly correlated to each other. For example, a pair of fuel cells, even if they have the same specifications could have different actual output characteristics due to manufacturing variation, aging, damage, or degradation.

DC optimizer 402, 403 could also be particularly useful to optimize the power of storage type generation such as batteries or fuel cells since it can be operated in a bi-directional manner.

DC optimizer 402, 403 could be operated as a bidirectional DC to DC converter and not necessarily as a DC optimizer. Power could flow in a direction opposite to the direction described above. For example, DC optimizer 402, 403 could be operated to receive DC power at terminal pair 412, 414 and output power to a pair of DC power sources. This could be useful for storage type DC power sources such as rechargeable batteries which could require periodic charging.

Additionally, the dual source DC optimizer concept provided by the embodiments herein can be extended beyond two power sources to any even number of independent DC power sources.

Figure 5:
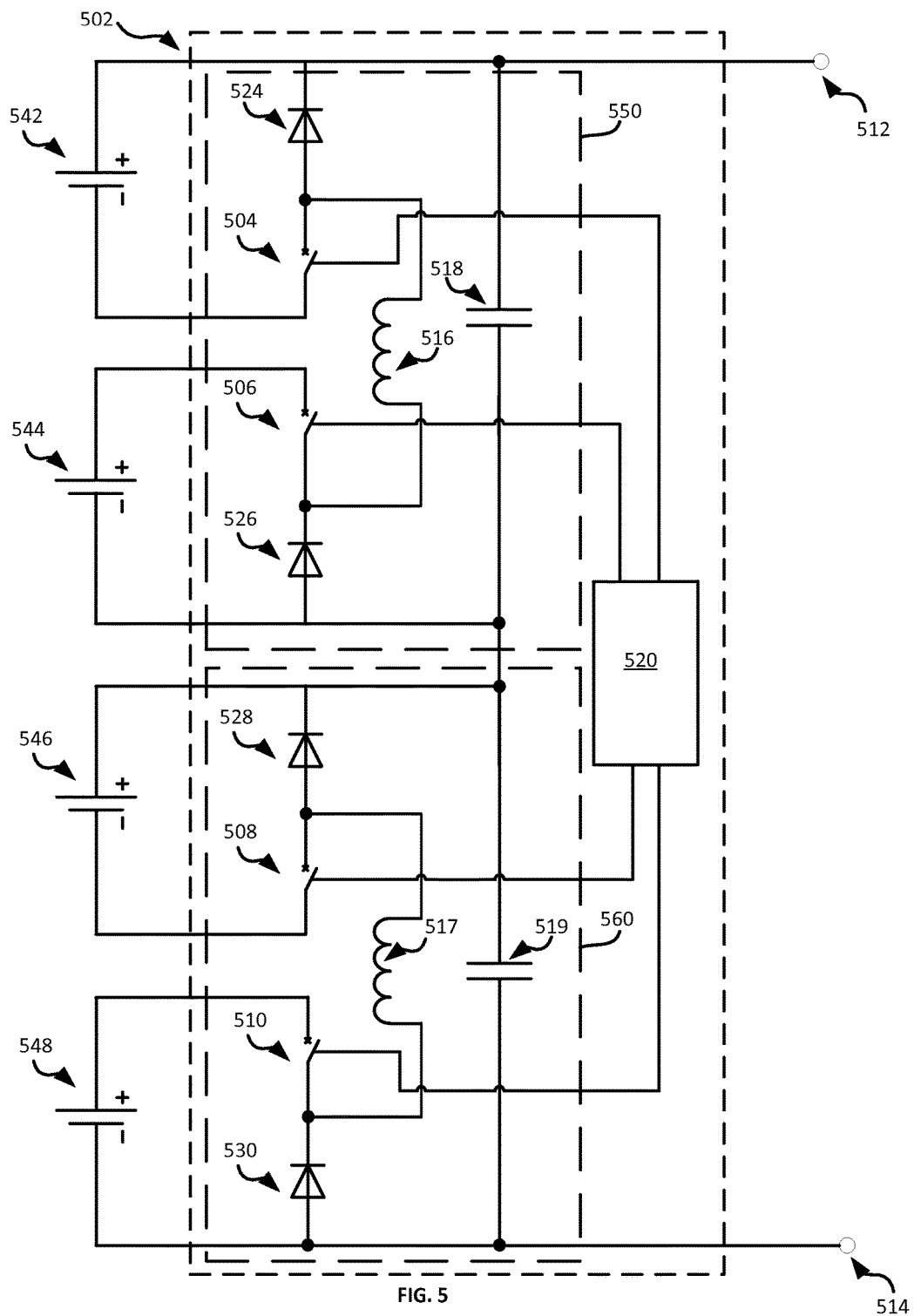
FIG. 5 is a circuit diagram of a DC optimizer for four independent DC power sources according to an embodiment herein.

FIG. 5, with reference to FIGS. 1 through 4F, is a circuit diagram of a DC optimizer 502 for four independent DC power sources. DC optimizer 502 comprises switches 504, 506, 508, 510, diodes 524, 526, 528, 530, inductors 516, 517, capacitors 518, 519, output terminal pair 512, 514, and controller 520. DC optimizer 502 optimizes the power output of independent DC power supplies 542, 544, 546, 548. DC optimizer 502 comprises upper optimizer portion 550 and lower optimizer portion 560. The operation of each portion is identical to the operation of DC optimizer 302.

DC power supplies 542, 544, 546, 548 could be substrings of a PV panel. The PV panel could be divided into four, serially-connected substrings and the output of each substring could be separately optimized by DC optimizer 502. Output terminal pair 512, 514 could operatively connect to a PV panel string (not shown in FIG. 5).

Figure 6:
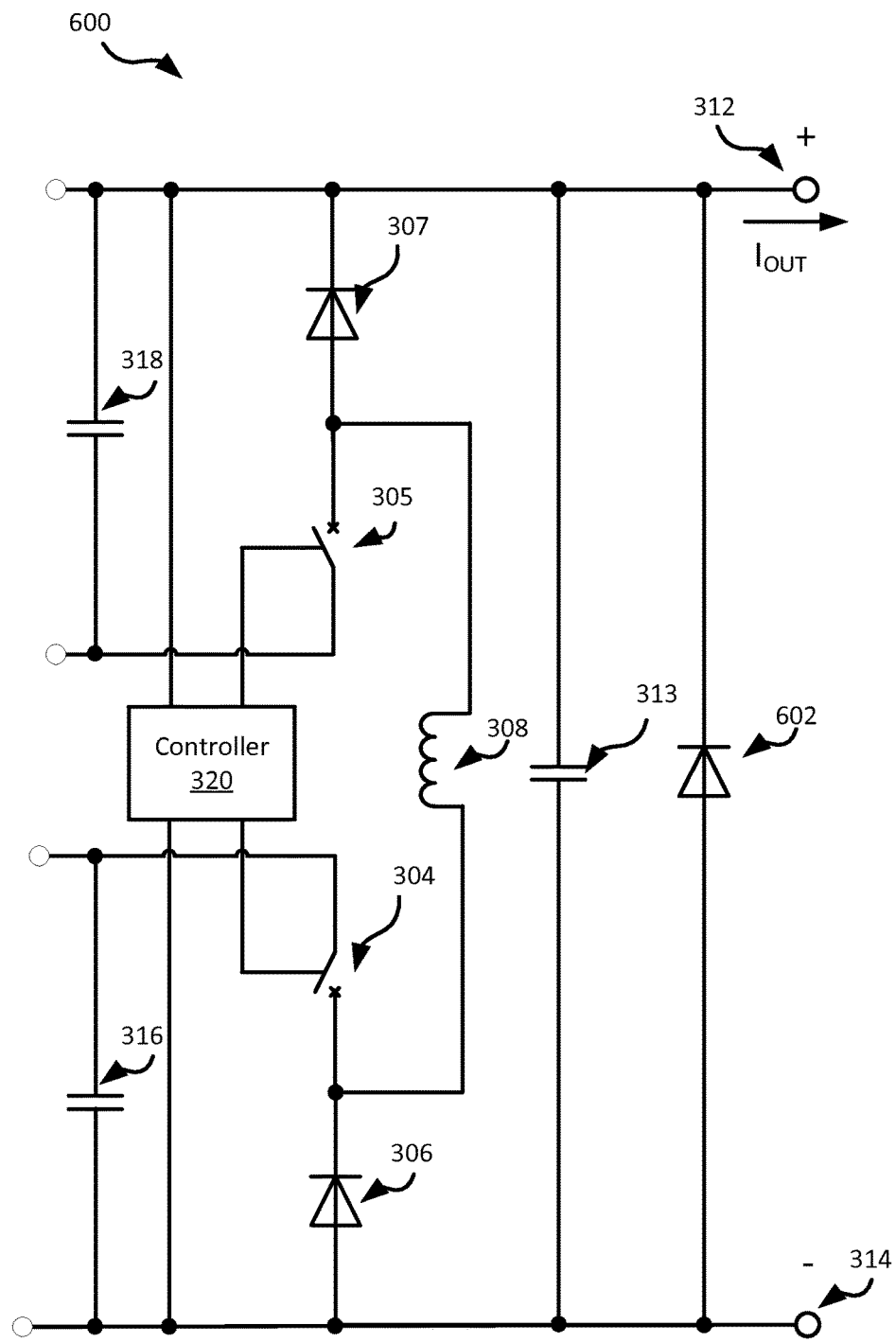
FIG. 6 is a circuit diagram of another dual source DC optimizer according to an embodiment herein.

FIG. 6, with reference to FIGS. 1 through 5, is a circuit diagram of another dual source DC optimizer 600. DC optimizer 600 is identical to DC optimizer 302 except for the addition of bypass diode 602 and could have improved power efficiency over DC optimizer 302. When DC optimizer 302 is operated as depicted in FIG. 3E, diodes 306, 307 are conducting the string current. The power dissipation is the string current times the voltage drops in diodes 306, 307. DC optimizer 600 could have improved power dissipation relative to DC optimizer 302 in this situation since diode 602 would conduct the string current resulting in only one forward bias voltage drop rather than two. DC optimizers 303, 402, 403 could be similarly modified by the addition of a bypass diode at their outputs.

The operation of DC optimizer 302, 303, 402, 403, 500, 600 is not restricted to operation as a DC optimizer. DC optimizer 302, 303, 402, 403, 500, 600 could also be operated as a general DC to DC converter to convert DC power at the voltages of its input power sources to DC power at another, lower DC voltage for consumption by a load at their output. For example, DC optimizer 302, 303, 402, 403, 500, 600 could be operated as a DC power supply. In this embodiment the output voltage and current of DC optimizer 302, 303, 402, 403, 500, 600 could be determined by the requirements of its connected load. For example, a load might require a constant voltage of 5 V and varying amount of current. The duty cycles of the buck type DC to DC converters comprising DC optimizer 302, 303, 402, 403, 500, 600 could be determined by the voltages of their respective DC power sources and the required output voltage. The sum of the buck type DC to DC converter's output voltages could be controlled to sum to the required output voltage and the output current could be controlled to equal the required output current.

Figure 7:
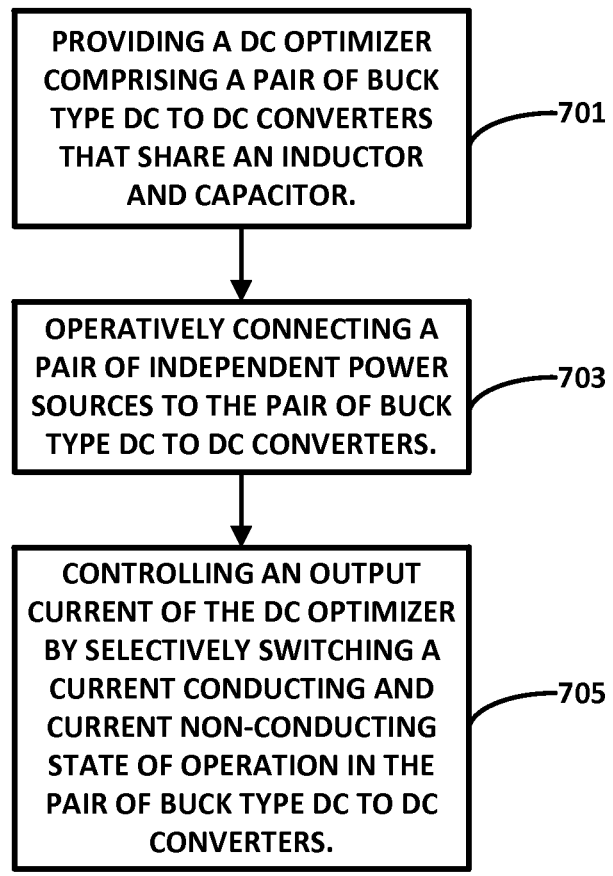
FIG. 7 is a flow diagram illustrating a method according to an embodiment herein.

FIG. 7, with reference to FIGS. 1 through 6, is a flow diagram illustrating a method according to an embodiment herein. The method comprises providing (701) a DC optimizer (e.g., DC optimizer 302, 303, 402, 403, 500, 502, 600) comprising a pair of buck type DC to DC converters (e.g., DC to DC converter 250, 280, 282) that share an inductor (e.g., inductors 208, 258, 308, 416, 516, 517) and capacitor (e.g., capacitors 210, 260, 313, 410, 518, 519); operatively connecting (703) a pair of independent power sources to the pair of buck type DC to DC converters (e.g., DC to DC converter 250, 280, 282), wherein the DC optimizer (e.g., DC optimizer 302, 303, 402, 403, 500, 502, 600) optimizes respective power outputs of the pair of independent power sources (e.g., power sources/supplies 270, 310, 311, 542, 544, 546, 548); and controlling (705) an output current of the DC optimizer (e.g., DC optimizer 302, 303, 402, 403, 500, 502, 600) by selectively switching a current conducting and current non-conducting state of operation in the pair of buck type DC to DC converters (e.g., DC to DC converter 250, 280, 282).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A system comprising:
  a first buck type direct current (DC) to DC converter comprising:
    a first control switch;
    a first synchronized switch;
    an inductor; and
    a capacitor;
  a second buck type DC to DC converter comprising:
    a second control switch;
    a second synchronized switch;
    said inductor; and
    said capacitor,
  a single controller operatively connected to both said first buck type DC to DC converter and said second buck type DC to DC converter, wherein the controller controls a conduction state of said first control switch and said second control switch; and
  an output terminal pair operatively connected to said capacitor,
  wherein said first control switch is directly connected to said first synchronized switch at a first connection point, wherein said second control switch directly connects to said second synchronized switch at a second connection point, and wherein said inductor directly connects to said first connection point and said second connection point.

2. The system of claim 1, wherein said first synchronized switch comprises a first diode; and wherein said second synchronized switch comprises a second diode.

3. The system of claim 1, wherein said controller controls operation of the first and second synchronized switches.

4. The system of claim 1, further comprising a bypass diode operatively connected to said output terminal pair.

5. The system of claim 1, further comprising:
  a first power source operatively coupled to said first buck type DC to DC converter; and
  a second power source operatively coupled to said second buck type DC to DC converter.

6. The system of claim 5, wherein the first and second buck type DC to DC converters and said controller operate as a DC optimizer.

7. The system of claim 6, wherein said controller operates said DC optimizer to maintain the first and second power sources at their respective maximum power points.

8. The system of claim 5, wherein the first and second buck type DC to DC converters and said controller operate as a DC power supply and supply a constant DC output voltage.

9. The system of claim 5, wherein the first and second DC to DC converters and said controller operate as a bi-directional DC power supply and supply a constant DC output voltage.

10. The system of claim 5, wherein any of the first and second power sources comprise a solar photovoltaic panel.

11. The system of claim 5, wherein any of said first and second power sources comprise any of a fuel cell, a battery, and a storage type power source.

12. The system of claim 5, wherein said first control switch directly connects to a positive terminal of said first power source at a third connection point, wherein said second control switch directly connects to a negative terminal of said second power source at a fourth connection point, and wherein said capacitor couples between said third connection point and said fourth connection point.

13. The system of claim 5, further comprising:
  a power source string comprising at least one DC optimizer configured to be serially connected with at least another DC optimizer; and
  an inverter operatively connected to said power source string.

14. The system of claim 13, wherein said controller operates said at least one DC optimizer such that an output current of said at least one DC optimizer matches a string current of said power source string.

15. The system of claim 5, wherein said first control switch controls an output power of said first power source, and wherein said second control switch controls an output power of said second power source.

16. The system of claim 5, wherein said first buck type DC to DC converter converts a DC voltage of said first power source to an equal or lower first voltage, wherein said second buck type DC to DC converter converts a DC voltage of said second power source to an equal or lower second voltage, and wherein a sum of said first and second voltages appear at said output terminal pair.

17. The system of claim 5, wherein a duty cycle of said first switch determines an output current of said first buck type DC to DC converter, and wherein a duty cycle of said second switch determines an output current of said second buck type DC to DC converter.

18. The system of claim 5, wherein each of said first control switch and said second control switch articulate from an open state of operation and a closed state of operation, and wherein said closed state of operation permits current from any of said first power source and said second power source to flow therethrough and through to said output terminal pair.

19. The system of claim 18, wherein in said open state of operation, current flowing in said inductor during said closed state of operation continues to flow from said inductor through to said output terminal pair.

20. The system of claim 1, wherein said first control switch and said first synchronized switch comprises a first pair of switches, wherein said second control switch and said second synchronized switch comprises a second pair of switches, wherein each of said first pair of switches and said second pair of switches comprise a first complementary switch and a second complementary switch, wherein when said first complementary switch is in said closed state of operation said second complementary switch is in said open state of operation, and wherein when said first complementary switch is in said open state of operation said second complementary switch is in said closed state of operation.

21. The system of claim 1, further comprising:
a third buck type DC to DC converter comprising:
  a third control switch;
  a third synchronized switch;
  a second inductor; and
  a second capacitor;
a fourth buck type DC to DC converter comprising:
  a fourth control switch;
  a fourth synchronized switch;
  said second inductor; and
  said second capacitor,
a third power source operatively coupled to said third buck type DC to DC converter;
a fourth power source operatively coupled to said fourth buck type DC to DC converter; and
a controller operatively connected to the first, second, third, and fourth buck type DC to DC converters, wherein said controller controls a conduction state of the first, second, third, and fourth control switches,
wherein said first, second, third, and fourth buck type DC to DC converters form said DC optimizer,
wherein said third control switch is directly connected to said third synchronized switch at a third connection point,
wherein said fourth control switch is directly connected to said fourth synchronized switch at a fourth connection point, and
wherein said second inductor directly connects to said third connection point and said fourth connection point.

22. The system of claim 21, wherein said controller is operatively connected to said third buck type DC to DC converter and said fourth buck type DC to DC converter, wherein said controller controls a conduction state of said third control switch and said fourth control switch, and wherein said output terminal pair is operatively connected to said second capacitor.

23. A photovoltaic (PV) panel string comprising:
a plurality of serially connected DC optimizers, wherein at least one of said DC optimizers comprising a first buck type DC to DC converter and a second buck type DC to DC converter,
wherein said first buck type DC to DC converter comprises:
  a first control switch;
  a first synchronized switch;
  an inductor; and
  a capacitor,
wherein said second buck type DC to DC converter comprises:
  a second control switch;
  a second synchronized switch;
  said inductor; and
  said capacitor;
a first solar PV panel operatively connected to said first buck type DC to DC converter; and
a second solar PV panel operatively connected to said second buck type DC to DC converter;
a single controller operatively connected to both said first buck type DC to DC converter and said second buck type DC to DC converter, wherein the controller controls a conduction state of said first control switch and said second control switch; and
an output terminal pair operatively connected to said capacitor,
wherein said first control switch is directly connected to said first synchronized switch at a first connection point, wherein said second control switch is directly connected to said second synchronized switch at a second connection point, and wherein said inductor directly connects to said first connection point and said second connection point.

* * * * *